(12) United States Patent
Ferentz et al.

(10) Patent No.: US 12,363,520 B2
(45) Date of Patent: Jul. 15, 2025

(54) EMERGENCY COMMUNICATION TRANSLATION IN EMERGENCY RESPONSE DATA PLATFORM

(71) Applicant: RapidSOS, Inc., New York, NY (US)

(72) Inventors: Zvika Ferentz, New York, NY (US); Isaac Loloey, Kew Gardens, NY (US); Jeffrey Sternberg, Long Island, NY (US)

(73) Assignee: RapidSOS, Inc., New York, NY (US)

( * ) Notice: Subject to any disclaimer, the term of this patent is extended or adjusted under 35 U.S.C. 154(b) by 502 days.

(21) Appl. No.: 17/738,779

(22) Filed: May 6, 2022

(65) Prior Publication Data

US 2022/0360963 A1 Nov. 10, 2022

Related U.S. Application Data

(60) Provisional application No. 63/185,670, filed on May 7, 2021.

(51) Int. Cl.

| | |
|---|---|
| *H04W 4/90* | (2018.01) |
| *G06F 40/166* | (2020.01) |
| *G06F 40/263* | (2020.01) |
| *G06F 40/279* | (2020.01) |
| *G06F 40/58* | (2020.01) |
| *G10L 15/22* | (2006.01) |
| *G10L 15/26* | (2006.01) |

(52) U.S. Cl.
CPC ............ *H04W 4/90* (2018.02); *G06F 40/166* (2020.01); *G06F 40/263* (2020.01); *G06F 40/279* (2020.01); *G06F 40/58* (2020.01); *G10L 15/22* (2013.01); *G10L 15/26* (2013.01)

(58) Field of Classification Search
CPC ......... H04W 4/90; H04W 4/12; G06F 40/166; G06F 40/263; G06F 40/279; G06F 40/58; G10L 15/22; G10L 15/26
See application file for complete search history.

(56) References Cited

U.S. PATENT DOCUMENTS

| | | | |
|---|---|---|---|
| 7,515,036 B2 * | 4/2009 | McClenny | H04N 7/163 455/192.3 |
| 10,375,558 B2 | 8/2019 | Katz et al. | |
| 2011/0088058 A1 * | 4/2011 | Velazquez | H04N 21/64322 725/33 |
| 2022/0201456 A1 * | 6/2022 | Chiang | H04L 12/1813 |

* cited by examiner

*Primary Examiner* — Kabir A Timory
(74) *Attorney, Agent, or Firm* — Sterne, Kessler, Goldstein & Fox. P.L.L.C.

(57) ABSTRACT

Disclosed herein are system, method, and computer program product embodiments for providing emergency communication translation and functions. An embodiment operates by receiving a first emergency communication to be sent to an emergency service provider. The embodiment determines, from the first emergency communication, that a language associated with the first emergency communication is different from a standard language. In response to the determining, the embodiment generates a second emergency communication based on the first emergency communication, where the second emergency communication is in the standard language. The embodiment then sends the second emergency communication to the emergency service provider.

20 Claims, 15 Drawing Sheets

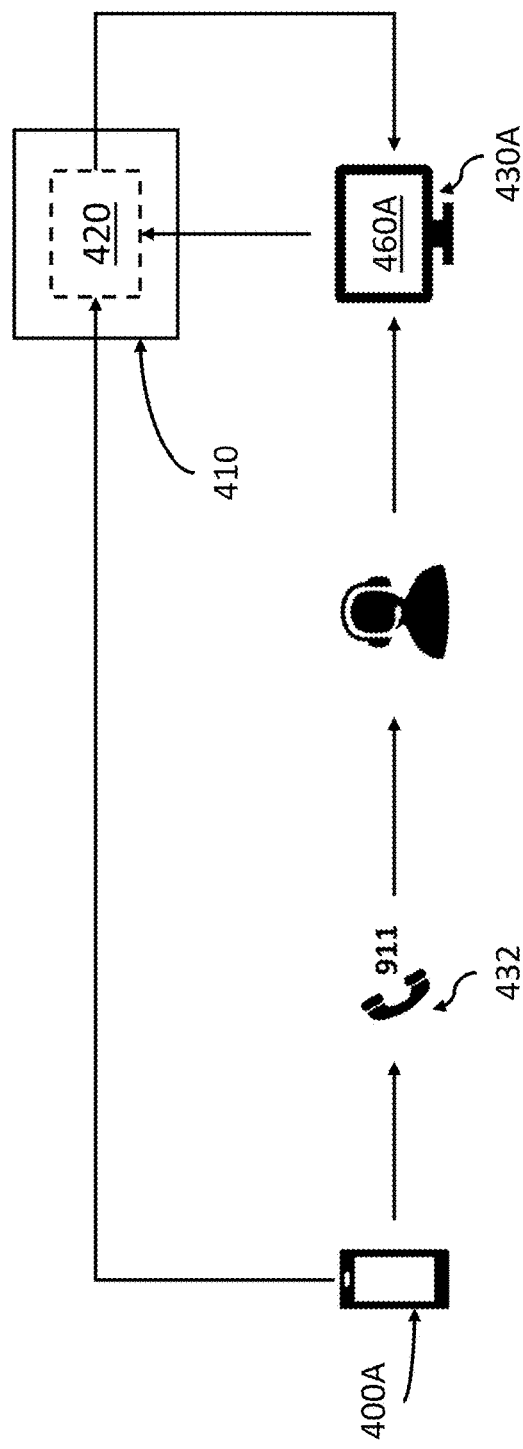
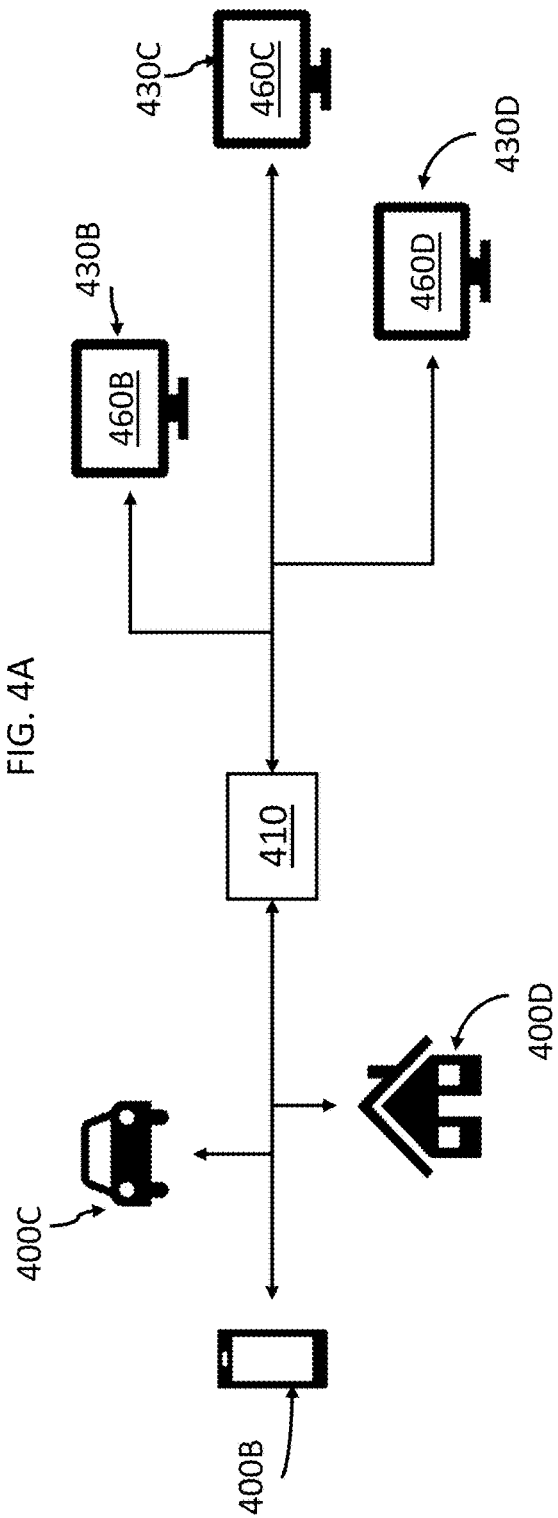

FIG. 6B

EMERGENCY COMMUNICATION TRANSLATION IN EMERGENCY RESPONSE DATA PLATFORM

CROSS-REFERENCE TO RELATED APPLICATIONS

This application claims priority to U.S. Provisional Patent Application No. 63/185,670 titled "Emergency Communication Translation In Emergency Response Data Platform" filed on May 7, 2021, which is herein incorporated by reference in its entirety for all purposes.

BACKGROUND

Field

The described aspects generally relate to mechanisms for providing emergency communication translation and functions.

Related Art

A person in an emergency situation may request help using a mobile communication device such as a cell phone to dial a designated emergency number like 9-1-1 or a direct access phone number for the local emergency service provider (e.g. an emergency dispatch center). Traditionally, this call is assigned to one or more first responders by the emergency service provider, and the caller's estimated location (generally either the location of a nearby cell tower or a triangulation from the location of three or more nearby cell towers) is provided to the emergency service provider by the caller's wireless carrier (e.g., AT&T). Alternatively, the caller may provide their location to the emergency service provider by verbally speaking their location over the phone. Unfortunately, many emergency callers are unaware of their precise location or otherwise unable to verbalize it.

However, modern technologies have enabled the development and implementation of previously unimaginable or unachievable emergency services. For example, modern communication devices are capable of generating highly accurate, real-time locations (e.g., device-based hybrid locations) during emergency situations (e.g., in response to an emergency number being dialed) and transmitting the locations to emergency management systems and emergency service providers. Emergency service providers can then use these accurate locations to more quickly locate and dispatch emergency assistance to emergency callers. In another example, devices such as surveillance cameras can capture images, videos, or audio that can be shared in real-time with emergency management systems and emergency service providers to provide emergency service providers with situational awareness that they did not have access to in the past.

In current systems, when a person in an emergency situation, who does not speak English, calls an emergency number like 9-1-1, the emergency number operator may not be able to understand the caller. The emergency number operator also may not recognize the language that the caller is speaking. In these situations, the emergency number operator has to try to find a translator to speak with the caller and translate the information provided by the caller to the operator. However, the attempts to determine the language spoken by the caller, to find a person that speaks the caller's language, and the translation provided by the person that speaks the caller's language can take valuable time and resources not used for helping remedy the emergency situation.

SUMMARY

Disclosed herein are also systems, devices, media, and methods for providing emergency communication translation and functions. Some embodiments of this disclosure are directed to a computer implemented method for emergency communication translation. The computer implemented method includes receiving a first emergency communication to be sent to an emergency service provider and determining, from the first emergency communication, that a language associated with the first emergency communication is different from a standard language. In response to the determining, the computer implemented method further includes generating a second emergency communication based on the first emergency communication, where the second emergency communication is in the standard language. The computer implemented method further includes sending the second emergency communication to the emergency service provider.

In some embodiments, the standard language is English. In some embodiments, computer implemented method further includes sending the second emergency communication to a computer aided dispatch (CAD) system or a record management system (RMS).

In some embodiments, the first emergency communication includes at least one of a short message service (SMS) message, internet-based message, portions of an emergency call, a recorded audio/video feed, and a live audio/video feed. In some embodiments, the emergency call comprise a landline call, a cellular line call, or a Voice over Internet Protocol (VoIP) call.

In some embodiments, generating the second emergency communication includes translating, in real-time or in near real-time, the first emergency communication from the language of the first emergency communication to the standard language.

In some embodiments, the computer implemented method further includes receiving a third emergency communication from the emergency service provider, where the third emergency communication is in the standard language. The computer implemented method further includes generating a fourth emergency communication based on the second emergency communication, where the fourth emergency communication is in the language of the first emergency communication.

In some embodiments, the determining that the language associated with the first emergency communication is different from the standard language includes storing a portion of the first emergency communication, converting the portion of the first emergency communication to text data, and determining, based on the text data, that the language associated with the first emergency communication is different from the standard language.

In some embodiments, generating the second emergency communication includes storing a portion of the first emergency communication, converting the portion of the first emergency communication to first text data, and generating second text data by translating the first text data from the language associated with the first emergency communication to the standard language. In some embodiments, the computer implemented method further includes displaying the second text in a graphical user interface (GUI) of an emergency response application. In some embodiments, sending of the second emergency communication to the emergency service provider includes sending the second text data to the emergency service provider. Additionally, or alternatively, sending the second emergency communication to the emergency service provider includes converting the second text data to voice data, where the voice data is in the standard language and sending the voice data to the emergency service provider.

In some embodiments, generating the second emergency communication includes sampling a predetermined portion of the first emergency communication and translating the sampled portion of the first emergency communication from the language associated with the first emergency communication to the standard language.

In some embodiments, the computer implemented method further includes receiving data associated with a user device and determining, based on the data associated with the user device, that the first emergency communication is in the language different from the standard language. The data associated with the user device includes at least one of location data associated with the user device, language preference data set in the user device, language setting pre-installed on the user device, preference data associated with a keyboard of the user device, predicted language based on previous emergency communications, or demographics associated with a user of the user device.

In some embodiments, the computer implemented method further includes receiving data associated with a user device and predicting, based on the data associated with the user device, that the first emergency communication is in the language different from the standard language. The data associated with the user device includes at least one of location data associated with the user device, language preference data set in the user device, language setting pre-installed on the user device, preference data associated with a keyboard of the user device, predicted language based on previous emergency communications, or demographics associated with a user of the user device.

In some embodiments, the determining that the language associated with the first emergency communication is different from the standard language comprises at least one of receiving, from a user device, a first request indicating the language of the first emergency communication or receiving, from the user device, a second request indicating that the first emergency communication is to be translated.

In some embodiments, the computer implemented method further includes in response to determining that that the language associated with the first emergency communication is different from the standard language, sending a text or a voice response in the language associated with the first emergency communication to a user device. The computer implemented method further includes receiving, from the user device, a confirmation that the determined language associated with the first emergency communication is the language used by a user of the user device.

In some embodiments, the second emergency communication includes a summary of the first emergency communication. The summary of the first emergency communication can include one or more emergency keywords in the standard language. Additionally, or alternatively, the summary of the first emergency communication can include one or more codes associated with the first emergency communication. In some embodiments, the one or more codes can be in the standard language and be associated with the first emergency communication. In some embodiments, the one or more codes can be in the standard language and can be associated with the one or more emergency keywords.

In some embodiments, the computer implemented method further includes displaying a probability value indicating a confidence level that the second emergency communication is an accurate translation of the first emergency communication.

In some embodiments, the computer implemented method further includes storing at least a first portion of the first emergency communication and a second portion of the second emergency communication. The computer implemented method further includes using the first portion of the first emergency communication and the second portion of the second emergency communication to update an algorithm used for the determining and the generating for subsequent emergency communications.

Some embodiments of this disclosure are directed to a system for emergency communication translation. The system includes a memory and at least one processor coupled to the memory. The at least one processor is configured to receive a first emergency communication to be sent to an emergency service provider and determine, from the first emergency communication, that a language associated with the first emergency communication is different from a standard language. In response to the determining, the at least one processor is further configured to generate a second emergency communication based on the first emergency communication, where the second emergency communication is in the standard language. The at least one processor is further configured to send the second emergency communication to the emergency service provider.

Some embodiments of this disclosure are directed to a non-transitory computer-readable medium having instructions stored thereon that, when executed by at least one computing device, cause the at least one computing device to perform operations. The operations include receiving a first emergency communication to be sent to an emergency service provider and determining, from the first emergency communication, that a language associated with the first emergency communication is different from a standard language. In response to the determining, the operations further include generating a second emergency communication based on the first emergency communication, where the second emergency communication is in the standard language. The operations further include sending the second emergency communication to the emergency service provider.

Some embodiments of this disclosure are directed to a computer implemented method for emergency communication translation that includes receiving a first emergency communication to be sent to an emergency service provider and determining, from the first emergency communication, that a language associated with the first emergency communication is different from a standard language. The computer implemented method further includes determining, based on the language associated with the first emergency communication, a specialized language line associated with the emergency service provider for the language associated with the first emergency communication. The computer implemented method further includes sending the first emergency communication to the determined specialized language line.

In some embodiments, the standard language is English. In some embodiments, sending the first emergency communication to the determined specialized language line further includes sending additional data indicating the language of the first emergency communication.

In some embodiments, sending the first emergency communication to the determined specialized language line further includes sending a probability value indicating a confidence level that the additional data indicating the language of the first emergency communication indicates an accurate language of the first emergency communication.

Some embodiments of this disclosure are directed to a system for emergency communication translation. The system includes a memory and at least one processor coupled to the memory. The at least one processor is configured to receive a first emergency communication to be sent to an emergency service provider and determine, from the first emergency communication, that a language associated with the first emergency communication is different from a standard language. The at least one processor is further configured to determine, based on the language associated with the first emergency communication, a specialized language line associated with the emergency service provider for the language associated with the first emergency communication. The at least one processor is further configured to send the first emergency communication to the determined specialized language line.

Some embodiments of this disclosure are directed to a non-transitory computer-readable medium having instructions stored thereon that, when executed by at least one computing device, cause the at least one computing device to perform operations. The operations include receiving a first emergency communication to be sent to an emergency service provider and determining, from the first emergency communication, that a language associated with the first emergency communication is different from a standard language. The operations further include determining, based on the language associated with the first emergency communication, a specialized language line associated with the emergency service provider for the language associated with the first emergency communication. The operations further include sending the first emergency communication to the determined specialized language line.

Some embodiments of this disclosure are directed to a computer implemented method for emergency communication translation that includes receiving a first emergency communication to be sent to an emergency service provider and determining, from the first emergency communication, a language associated with the first emergency communication. The computer implemented method further includes displaying the determined language at an emergency response application.

In some embodiments, determining the language associated with the emergency communication further includes storing a portion of the emergency communication, converting the portion of the emergency communication to text data, and determining, based on the text data, the language associated with the emergency communication In some embodiments, displaying the determined language further includes displaying a probability value indicating a confidence level that determine language is an accurate language of the emergency communication.

In some embodiments, the computer implemented method further includes, in response to the determining, generating a second emergency communication based on the emergency communication, where the second emergency communication is in a standard language. The computer implemented method further includes displaying the second emergency communication.

In some embodiments, the computer implemented method further includes determining one or more emergency keywords in the first emergency communication and generating a second emergency communication from the one or more emergency keywords. The second emergency communication include a summary of the emergency communication and is in a standard language. The computer implemented method further includes displaying the second emergency communication. Additionally, or alternatively, the summary of the emergency communication can include one or more codes associated with the emergency communication. In some embodiments, the one or more codes can be in the standard language and be associated with the emergency communication. In some embodiments, the one or more codes can be in the standard language and can be associated with the one or more emergency keywords.

In some embodiments, the computer implemented method further includes storing at least a portion of the emergency communication and the determined language and using the portion of the emergency communication and the determined language to update an algorithm used for determining the language associated with the emergency communication for subsequent emergency communications.

Some embodiments of this disclosure are directed to a system for emergency communication translation. The system includes a memory and at least one processor coupled to the memory. The at least one processor is configured to receive a first emergency communication to be sent to an emergency service provider and determine, from the first emergency communication, a language associated with the first emergency communication. The at least one processor is further configured to display the determined language at an emergency response application.

Some embodiments of this disclosure are directed to a non-transitory computer-readable medium having instructions stored thereon that, when executed by at least one computing device, cause the at least one computing device to perform operations. The operations include receiving a first emergency communication to be sent to an emergency service provider and determining, from the first emergency communication, a language associated with the first emergency communication. The operations further include displaying the determined language at an emergency response application.

BRIEF DESCRIPTION OF THE DRAWINGS

The accompanying drawings are incorporated herein and form a part of the specification.

FIGS. 4A and 4B depict systems and processes for receiving and transmitting emergency data by an emergency response data platform, according to some embodiments of the present disclosure.

FIG. 6B illustrates another exemplary GUI provided by the emergency response application for emergency communication translation, according to some embodiments of the present disclosure.

In the drawings, like reference numbers generally indicate identical or similar elements. Additionally, generally, the left-most digit(s) of a reference number identifies the drawing in which the reference number first appears.

DETAILED DESCRIPTION

Figure 1:
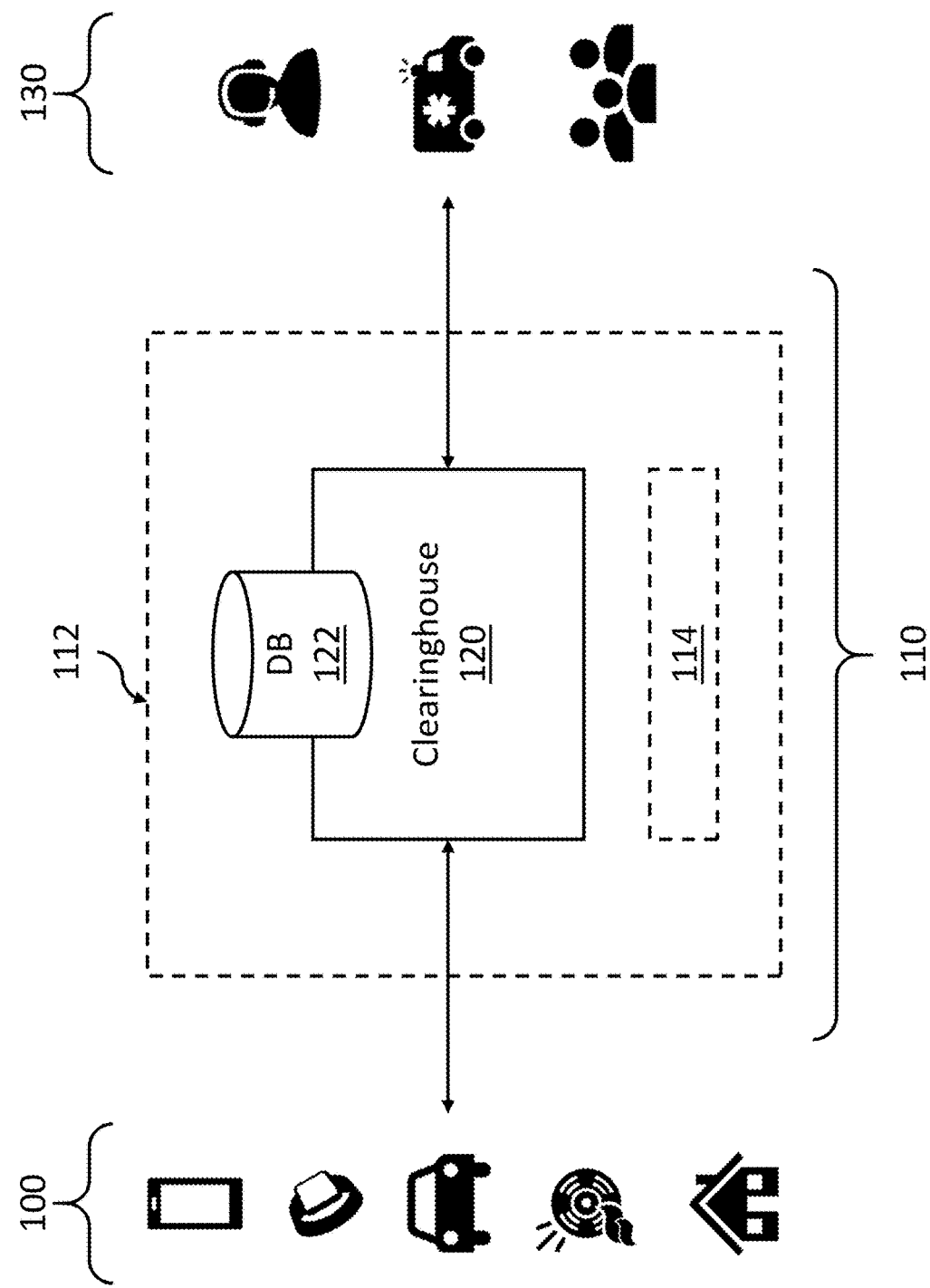
FIG. 1 depicts a diagram of an emergency response data platform, according to some embodiments of the present disclosure.

One advantage provided by the systems, servers, devices, methods, and computer-readable media of the instant application is the ability to gather and deliver device-based hybrid locations (hereinafter, "enhanced locations") and additional data that may be pertinent to emergency situations to emergency service providers (ESPs). ESPs may include, but are not limited to, public safety answering points, fire departments, police departments, paramedics, and police officers. In some embodiments, an emergency management system (EMS) includes a clearinghouse (also referred to as an "Emergency Clearinghouse") that functions to receive enhanced locations (e.g., device-based hybrid location, verified location) and additional data (e.g., medical history, video feeds, sensor data) from various sources (e.g., medical databases, mobile devices of public or first responders, public cameras, police systems, media outlets). The EMS can receive the enhanced locations and the additional data at various times before, during, or after emergency situations and distribute enhanced locations and additional data to ESPs to aid emergency responders in responding to live emergency situations. In some embodiments, the enhanced locations and additional data are delivered by the EMS to a public safety answering point (PSAP). In some embodiments, the enhanced locations and additional data are displayed within a preexisting pathway, such as an Automatic Location Identification (ALI) display. In some embodiments, the enhanced locations and additional data are obtained through alternative pathways directly from the devices in the emergency. In some embodiments, relevant emergency data from different sources are consolidated and displayed for rapid and efficient response. In some embodiments, the enhanced locations and additional data are displayed through a graphical user interface provided by an emergency response application separate from the preexisting ESP system (e.g., PSAP system).

Disclosed herein are also systems, devices, media, and methods for providing enhanced emergency communications and functions. Embodiments of the present disclosure take advantage of technological advancements that have allowed for mobile communication devices to generate accurate locations by incorporating multiple technologies embedded in the devices, such as GPS, Wi-Fi, and Bluetooth to create device-based hybrid locations. Device-based hybrid locations are locations calculated on an electronic or communication device, as opposed to locations calculated using a network (e.g., a carrier network). Device-based hybrid locations can be generated using GPS, network-based technologies, Wi-Fi access points, Bluetooth beacons, barometric pressure sensors, dead reckoning using accelerometers and gyrometers, and a variety of crowdsourced and proprietary databases that device operating systems providers are running to enhance location technology. These device-based hybrid locations can be quickly generated during emergency calls.

Furthermore, electronic communication devices include various devices with communication capability to communicate with other devices via Wi-Fi, Bluetooth, etc. Many of these devices are Internet-abled and can communicate via the Internet by sending messages such as chat, email, HTTP post, etc. Some electronic communication devices have phone numbers and are enabled for cellular communication or VoIP, such as a SIM-enabled wearable device. Other devices may not have a phone number and be unable to make wireless calls or send SMS. In some cases, devices that do not have a phone number may be associated with the owner's account phone number or be assigned a number for the duration of the emergency session. Communication devices may include various devices such as computers, mobile phones, wearables, digital assistants, smart TVs, security systems, vehicular telematics systems, IoT sensors, etc. In some embodiments, mobile communication devices (e.g., mobile phones, wearables, IoT devices, smart home devices, vehicle computers, etc.) are often capable of generating or storing additional information that provides situational awareness about the emergency, such as health sensor data or medical histories. For example, during an emergency, a modern mobile communication device may have access to an implicated person's blood type, preexisting medical conditions, or even the implicated person's current heartrate. In another example, a sensor in the home can detect glass breakage indicating a possible burglary. In some embodiments, the mobile communication device has access to data from sensors (e.g., health or environmental sensors). For example, a video feed of the emergency via a connected surveillance camera can provide valuable situational awareness regarding the emergency.

Emergency Response Data Platform

In various embodiments, disclosed herein are devices, systems, and methods for managing emergency data and emergency communications for more effective and efficient emergency response. FIG. 1 depicts a diagram of an emergency response data platform in accordance with one embodiment of the present disclosure. In a simple example, in some embodiments, an emergency data source 100 transmits emergency to an emergency response data platform (ERDP) 110 before, during, or after an emergency, and the emergency response data platform shares the emergency data with an emergency service provider (ESP) 130. Exemplary ingress data sources includes mobile phones, wearables, vehicle telematics systems, smart security systems, and mobile applications. The ESP 130 can then use the emergency data to more efficiently and effectively respond to corresponding emergencies. In some embodiments, the emergency data source 100 is a third-party server system (hereinafter, "third-party server"). For example, in some embodiments, the emergency data source 100 is a third-party server (e.g., a backend server system) of a technology company that produces software for electronic devices, such as Apple or Google. In some embodiments, the emergency data source 100 is an electronic device, such as an electronic communication device. For example, the emergency data source 100 may be a communication device (e.g., a walkie talkie or two-way radio, a mobile or cellular phone, a computer, a laptop, etc.), a wearable device (e.g., a smartwatch), or an Internet of Things (IoT) device such as a home assistant (e.g., an Amazon Echo) or a connected smoke detector (e.g., a Nest Protect smoke and carbon monoxide alarm). In some embodiments, an electronic device includes a display, a processor, a memory (e.g., an EPROM memory, a RAM, or a solid-state memory), a network component (e.g., an antenna and associated components, Wi-Fi adapters, Bluetooth adapters, etc.), a data storage, a user interface, an emergency alert program, one or more location components, and one or more sensors. In some embodiments, the processor is implemented as one or more microprocessors, microcomputers, microcontrollers, digital signal processors, central processing units, state machines, logic circuitries, and/or devices that manipulate signals based on operational instructions. Among other capabilities, the processor is configured to fetch and execute computer-readable instructions stored in the memory.

In some embodiments, the display is part of the user interface (e.g., a touchscreen is both a display and a user interface in that it provides an interface to receive user input or user interactions). In some embodiments, the user interface includes physical buttons such as an on/off button or volume buttons. In some embodiments, the display and/or the user interface comprises a touchscreen (e.g., a capacitive touchscreen), which is capable of displaying information and receiving user input. In some embodiments, the communication device includes various accessories that allow for additional functionality. In some embodiments, these accessories (not shown) include one or more of the following: a microphone, a camera, speaker, a fingerprint scanner, health or environmental sensors, a USB or micro-USB port, a headphone jack, a card reader, a SIM card slot, or any combination thereof. In some embodiments, the one or more sensors include, but are not limited to: a gyroscope, an accelerometer, a thermometer, a heart rate sensor, a barometer, or a hematology analyzer. In some embodiments, the data storage includes a location data cache and a user data cache. In some embodiments, the location data cache is configured to store locations generated by the one or more location components.

In some embodiments, the emergency alert program is a web application or mobile application. In some embodiments, the emergency alert program is configured to record user data, such as a name, address, or medical data of a user associated with the electronic device. In some embodiments, the emergency alert program is configured to detect when an emergency request is generated or sent by the electronic device (e.g., when a user uses the electronic device to make an emergency call). In some embodiments, in response to detecting an emergency request generated or sent by the electronic device, the emergency alert program is configured to deliver a notification to the ERDP 110. In some embodiments, the notification is an HTTP post containing information regarding the emergency request. In some embodiments, the notification includes a location (e.g., a device-based hybrid location) generated by or for the electronic device. In some embodiments, in response to detecting an emergency request generated or sent by the electronic device, the emergency alert program is configured to deliver user data to the ERDP 110.

In some embodiments, the emergency response data platform (ERDP) 110 includes an ERDP operating system, an ERDP CPU, an ERDP memory unit, an EMS communication element, and one or more software modules. In some embodiments, the ERDP CPU is implemented as one or more microprocessors, microcomputers, microcontrollers, digital signal processors, central processing units, state machines, logic circuitries, and/or devices that manipulate signals based on operational instructions. Among other capabilities, the ERDP CPU is configured to fetch and execute computer-readable instructions stored in the ERDP memory unit. The ERDP memory unit optionally includes any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The ERDP memory unit optionally includes modules, routines, programs, objects, components, data structures, etc., which perform particular tasks or implement particular abstract data types.

In some embodiments, the ERDP 110 includes one or more ERDP databases, one or more servers, and a clearinghouse 120. In some embodiments, the clearinghouse 120, as described in further detail below, is an input/output (I/O) interface configured to manage communications and data transfers to and from the ERDP 110 and external systems and devices. In some embodiments, the clearinghouse 120 includes a variety of software and hardware interfaces, for example, a web interface, a graphical user interface (GUI), and the like. The clearinghouse 120 optionally enables the ERDP 110 to communicate with other computing devices, such as web servers and external data servers. In some embodiments, the clearinghouse 120 facilitates multiple communications within a wide variety of networks and protocol types, including wired networks, for example, LAN, cable, etc., and wireless networks, such as WLAN, cellular, or satellite. In some embodiments, the clearinghouse 120 includes one or more ports for connecting a number of devices to one another or to another server. In some embodiments, the clearinghouse 120 includes one or more sub-clearinghouses, such as location clearinghouse and additional data clearinghouse, configured to manage the transfer of locations and additional data, respectively. In some embodiments, the ERDP 110 additionally includes a user information module that receives and stores user information (e.g., personal information, demographic information, medical information, location information, etc.) within the ERDP 110. In some embodiments, users can submit user information through a website, web application, or mobile application, such as during a registration process for an emergency response application. In some embodiments, when the ERDP 110 receives emergency data including user information, such as through an emergency alert received by the clearinghouse 120 (as described below), the ERDP 110 stores the user information in the user information module. In some embodiments, user information stored within the user information module is received by the ERDP 110 from a third-party server system, as described above. In some embodiments, user information stored within the user information module is associated with an identifier of a user or an electronic device associated with a user, such as a phone number or an email address.

In some embodiments, the location data is generated by the electronic device before the emergency call and can be made accessible by the ERDP to an ESP during an emergency. For example, a taxi company may have software that transmits the location of its cars or assets to the emergency clearinghouse preemptively. Thus, when an emergency call is made, the location of the affected taxi can be made accessible quicker to send help. In addition, the ERDP may transmit emergency alerts even when the emergency call does not go through or gets disconnected based on the emergency data from the electronic device.

Using the ERDP 110 two-sided platform, relevant emergency data about one or more emergencies can be shared with one or more egress recipients, such as a call center (e.g., PSAP), emergency responders, or emergency contacts in a secure and efficient manner. Using the platform, authorized recipients are given access to relevant information for quick and efficient emergency response. For example, a PSAP is enabled to verify the location of an emergency caller via technology, rather than relying on a distressed caller to generate the location data. Thus, a PSAP can initiate a response before the user provides any location information, saving seconds or minutes on emergency response time.

In some cases, a primary agency (e.g., PSAP-1) may select an appropriate secondary agency to respond to the emergency. In some embodiments, a federal agency such as the Center for Disease Control (CDC) is planning and overseeing various state and local ESP agencies for dealing with outbreak of infectious diseases.

In some implementations, the emergency service request, such as an emergency call, may be retained by the primary agency while the secondary agency dispatches emergency responders to the emergency location. In other implementations, the emergency service request, such as an emergency call is transferred to the appropriate secondary agency based on emergency location, type and priority of the emergency.

A primary agency may be responsible for handling emergency service requests (such as traditional emergency calls and digital requests) within an authoritative jurisdiction, which may be defined by one or more geofences. A buffer region may be defined around the boundary of the geofence and the locations falling within the buffer region can be treated as locations falling within the geofence. The buffer region may be 1 meter to 10 km, or between 200 meters to 5 km, preferably 2 km. A secondary agency may also have a geofence, which defines the area of operation, but the service request regarding an emergency has to be initiated by a primary agency.

In addition, other types of ESP agencies are also contemplated. For example, ESPs may be temporarily set up to address a particular threat or a natural disaster, such as a hurricane. The constituting ESP agencies for such a "temporary ESP agency" may be the area that might be impacted by the threat or natural disaster. It is also contemplated that ESP agencies may be both public and private entities such as corporate security, university police, call center, etc.

As mentioned above, in some embodiments, the emergency response data platform (ERDP) 110 shares emergency data with an emergency service provider (ESP) 130. In some embodiments, an ESP 130 (e.g., a public safety answering point (PSAP)) is a system that includes one or more of a display, a user interface, at least one central processing unit or processor, a network component, an audio system, (e.g., microphone, speaker and/or a call-taking headset), and an ESP application (e.g., a computer program) such as a computer aided dispatch (CAD) program or an emergency call taking program (also referred to as customer premise equipment or CPE). In some embodiments, the ESP application comprises a database of emergency responders, such as medical assets, police assets, fire response assets, rescue assets, safety assets, etc. In some embodiments, the ESP application is an emergency response application provided by the ERDP 110, as described below. In some embodiments, the ESP application is installed on a computing device at the ESP 130 and comprise one or more software modules, such as a call taking module, an ESP display module, a supplemental or updated information module, or a combination thereof. In some embodiments, the ESP application displays the information on a map (e.g., on the display). In some embodiments, the ESP application is accessible or executable on mobile devices associated with ESP 130, such as first responder devices. In some embodiments, the ESP application is an emergency response application provided by the ERDP 110, as described below.

Emergency Clearinghouse

In some embodiments, as mentioned above with respect to FIG. 1, the emergency response data platform (ERDP) 110 includes a clearinghouse 120 (also referred to as an "Emergency Clearinghouse") for receiving, storing, retrieving, and transmitting emergency data. In some embodiments, as depicted by FIG. 1, through the clearinghouse 120, the ERDP 110 can receive emergency data from an emergency data source 100 (as described above) and transmit the emergency data to an emergency data recipient, such as an emergency service provider (ESP) 130 (as described above). In this way, the ERDP 110 acts as a data pipeline between emergency data sources 100 and ESPs 130. The emergency data that passes through the clearinghouse 120 may include (but is not limited to) location data (e.g., fixed addresses or device-based hybrid locations generated in real time) and additional data (e.g., medical history, personal information, or contact information, etc.). In some embodiments, through the clearinghouse 120, the ERDP 110 transmits emergency data to ESPs 130 to aid the ESPs 130 in responding to emergencies. For example, location data may allow emergency responders to arrive at the scene of an emergency faster, and additional data may allow emergency responders to be better prepared for the emergencies that they face.

The clearinghouse 120 may receive emergency data in various ways. For example, in some embodiments, an emergency data source 100 can unilaterally transmit emergency data to the clearinghouse 120. For example, in one embodiment, an emergency alert is triggered by an electronic device manually (e.g., in response to the selection of a soft or hard emergency button) or automatically based on sensor data received by the electronic device (e.g., smoke alarms). The electronic device can then transmit the emergency alert and any associated data to the ERDP 110, such as to an endpoint provided by the clearinghouse 120. Or, for example, in one embodiment, after an emergency alert is received by the ERDP 110 from a first emergency data source, the ERDP 110 can query a second emergency data source for emergency data (e.g., emergency data associated with the emergency alert received from the first emergency data source). For example, the emergency alert received from the first emergency data source may include a user identifier (e.g., a telephone number or an email address) for an owner or user of the first emergency data source. The ERDP 110 can then query the second emergency data source with the user identifier to retrieve additional emergency data associated with the owner or user of the first emergency data source. In some embodiments, emergency data received by the ERDP 110 is received in a format that is compatible with industry standards for storing and sharing emergency data. In some embodiments, the ERDP 110 formats emergency data that it receives into a format that is compatible with industry standards. For example, in some embodiments, the emergency data is formatted to be compatible with National Emergency Number Association (NENA) standards. In some embodiments, emergency data is formatted by the ERDP 110 to be compliant with the Presence Information Data Format Location Object (PIDF-LO) standard. In some embodiments, emergency data received by the ERDP 110 is stored within one or more databases 122. In some embodiments, emergency data received by the ERDP 110 is associated with one or more identifiers, such as a device or user identifier.

The clearinghouse 120 may share emergency data in various ways. For example, in some embodiments, an emergency data recipient, such as an ESP 130, can query the ERDP 110 for emergency data. For example, in some embodiments, an ESP 130 can query the ERDP 110 with a user identifier (e.g., a telephone number or an email address) to receive emergency data gathered or received by the ERDP 110 associated with the user identifier. Or for example, in some embodiments, an ESP 130 can query the ERDP 110 with a geospatial area to receive emergency data gathered or received by the ERDP 110 associated with the geospatial area. Alternatively, in some embodiments, the ERDP 110 can autonomously transmit emergency data to an emergency data recipient without first receiving a query from the emergency data recipient (also referred to as "pushing" emergency data, as opposed to emergency data being "pulled" with a query). In some embodiments, the ERDP 110 pushes emergency data to an emergency data recipient using an emergency data subscription system. Using the emergency data subscription system, an emergency data recipient can subscribe to the clearinghouse 120 for a particular device identifier, user identifier, ESP account, or geospatial area. After subscribing to a subscription, the emergency data recipient may automatically receive updates regarding the subscription without first sending a query for emergency data. For example, if an ESP 130 subscribes to a phone number, whenever the ERDP 110 receives updated emergency data associated with the phone number, the clearinghouse 120 can instantly and automatically transmit the updated emergency data associated with the phone number to the ESP 130.

As used herein, "emergency data" refers to data pertaining to an on-going or historical emergency. The emergency data may be generated at the time of the emergency. The emergency data may be generated before the emergency occurs and may be made accessible when the emergency occurs. In some embodiments, the emergency data comprises location data, particularly the current location of the emergency (often times based on the location of the user device). Because of privacy and security concerns, emergency data must be stored, accessed, transmitted using security and privacy measures.

As used herein, "sensor data" refers to information obtained or provided by one or more sensors. In some instances, a sensor is associated with a device (e.g., user has a communication device with a data link via Bluetooth with a wearable sensor, such as, for example, a heart rate monitor or a pedometer). Accordingly, in some embodiments, the device obtains sensor data from the sensor (e.g., heart rate from the heart rate monitor or distance traveled from the pedometer). In some instances, the sensor data is relevant to an emergency situation (e.g., heart rate during a cardiac emergency event). In some embodiments, a sensor and/or sensor device comprises an acoustic sensor, a breathalyzer, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g., on a football helmet to measure impact), a barometer, a pressure gauge, a thermometer, a proximity sensor, a motion detector (e.g., in a home security system), an occupancy sensor, or any combination thereof, and in some embodiments, sensor data comprises information obtained from any of the preceding sensors. In some embodiments, one or more sensors are physically separate from a user device. In further embodiments, the one or more sensors authorize the user device to obtain sensor data. In further embodiments, the one or more sensors provide or send sensor data to the user device autonomously. In some embodiments, the user device and the one or more sensors belong to the same group of devices, wherein member devices are authorized to share data. In some embodiments, a user device comprises one or more sensors (e.g., user device is a wearable device having a sensor or sensing component).

Emergency Data Geofencing

In some embodiments, a geofence system 112 is applied to the clearinghouse 120 or the ERDP 110 to ensure that emergency data reaches authorized recipients and to protect sensitive emergency data from being shared with unintended recipients. As depicted in FIG. 1, in some embodiments, when emergency data (e.g., an emergency location or additional data) is received by the ERDP 110 from an emergency data source 100, the emergency data is first processed by the geofence system 112 before being ingested by the clearinghouse 120. Similarly, in some embodiments, when a data request for emergency data is received by the ERDP 110 from an emergency data recipient (e.g., an ESP 130), the query is processed by the geofence system 112 before emergency data is transmitted to the emergency data recipient.

Generally, a geofence is a virtual perimeter that represents a real-world geographic area. A geofence can be dynamically generated—as in a radius around a point location—or a geofence can be a predefined set of boundaries (such as school zones or neighborhood boundaries). For emergency response, an emergency service provider (public or private entities) may be given jurisdictional authority to a certain geographical region or jurisdiction (also referred to as "authoritative regions"). In the context of emergency services, one or more geofences may correspond to the authoritative region of an ESP. In many cases, the ESP is a public entity such as a public safety answering point (PSAP) or a public safety service (PSS; e.g., a police department, a fire department, a federal disaster management agency, national highway police, etc.), which have jurisdiction over a designated area (sometimes, overlapping areas). Geofences are used to define the jurisdictional authority by various methods and in various Geographic Information System (GIS) formats. In some embodiments, geofences only represent authoritative regions if the geofence has been assigned or verified by a local, state, or federal government. In some embodiments, geofences represent assigned jurisdictions that are not necessarily authoritative regions. For example, in some embodiments, a geofence is unilaterally created by its associated ESP without verification or assignment by a local, state, or federal government.

In some embodiments, the ERDP 110 maintains a geofence database including one or more geofences associated with each ESP 130 that is or has ever been communicatively coupled to the ERDP 110. In some embodiments, a geofence associated with an ESP 130 may be submitted to the ERDP 110 by an administrator of the ESP 130, such as through an emergency response application (as described below) or via email. In some embodiments, when emergency data is received by the ERDP 110 the ERDP 110 identifies a location associated with the emergency data (e.g., an emergency location included in an emergency alert) and determines if the location is within the combined authoritative jurisdiction (i.e., within any one of the geofences stored in the geofence database). In some embodiments, if the location is not within the combined authoritative jurisdiction, the ERDP 110 rejects or drops the emergency data (also referred to as "ingress filtering"). In some embodiments, when the ERDP 110 receives a query for emergency data from an ESP 130, the ERDP 110 identifies a geofence associated with the ESP 130 and returns only emergency data associated with locations that are within the geofence associated with the ESP 130 (also referred to as "egress filtering). In some embodiments, geofences are used in routing emergency data that is pushed to an emergency data recipient. In some embodiments, example, as mentioned above, an emergency data recipient may subscribe to an ESP jurisdiction, or specifically to a geofence associated with the ESP (often times the authoritative jurisdiction of the ESP). Then, when the ERDP 110 receives emergency data associated with a location that is within the geofence to which the emergency data recipient has subscribed, the ERDP 110 can instantly and automatically push the emergency data to the emergency data recipient.

Emergency Flow Management System

In some embodiments, as depicted in FIG. 1, the emergency response data platform (ERDP) includes an emergency flow management system (EFMS) 114. Generally, the EFMS functions to provide digital connectivity to emergency services to devices and applications otherwise unable to access them. Using the EFMS, an administrator of a device or application can access an emergency flow editor (also referred to as an "emergency console"), select a default emergency flow or define their own custom emergency flow, and receive an emergency flow trigger script including an emergency flow identifier (also referred to as an "emergency flow ID") unique to their chosen emergency flow. The emergency flow trigger script can then be quickly and easily integrated into the administrator's device or application. When the emergency flow trigger script is executed by the administrator's device or application, an electronic notification including the emergency flow ID is transmitted to an endpoint provided by the EFMS, which prompts the EFMS to execute the associated emergency flow chosen by the administrator.

An emergency flow may prompt the EFMS to perform a variety of functions, including (but not limited to) transmitting a notification to an emergency contact, transmitting a request for emergency service to an emergency service provider (ESP), establishing an emergency communication bridge to facilitate a Voice over Internet Protocol (VoIP) call between two or more participants, transmitting emergency data to one or more emergency data recipients, or any combination thereof, depending on the administrator's intended use case. In some embodiments, the emergency console provides a set of default emergency flows to choose from. In some embodiments, the emergency console provides a graphical user interface (GUI) that a user (e.g., an administrator of a device or application) can user to create a custom emergency flow. In some embodiments, the GUI of the emergency console allows a user to create a custom emergency flow by dragging and dropping (or otherwise manipulating) graphical representations of emergency flow building blocks into various arrangements, which prompts the EFMS to automatically generate an emergency flow according to the arrangement of the emergency flow building blocks. In some embodiments, an emergency flow building block is defined by a short script (e.g., a compilation or block of written programming commands), written in a programming language, that contains instructions for executing one or more functions. In some embodiments, when a user arranges one or more emergency flow building blocks within the GUI of the emergency console, the EFMS generates an emergency flow according to the arrangement of the one or more emergency flow building blocks by compiling the short scripts defining each of the one or more emergency flow building blocks into a single emergency flow script. In some embodiments, the emergency console allows a user to edit or create an emergency flow script directly (e.g., without the use of graphical representations of emergency flow building blocks, such as by inputting written program commands directly into a programming language input field).

Figure 2:
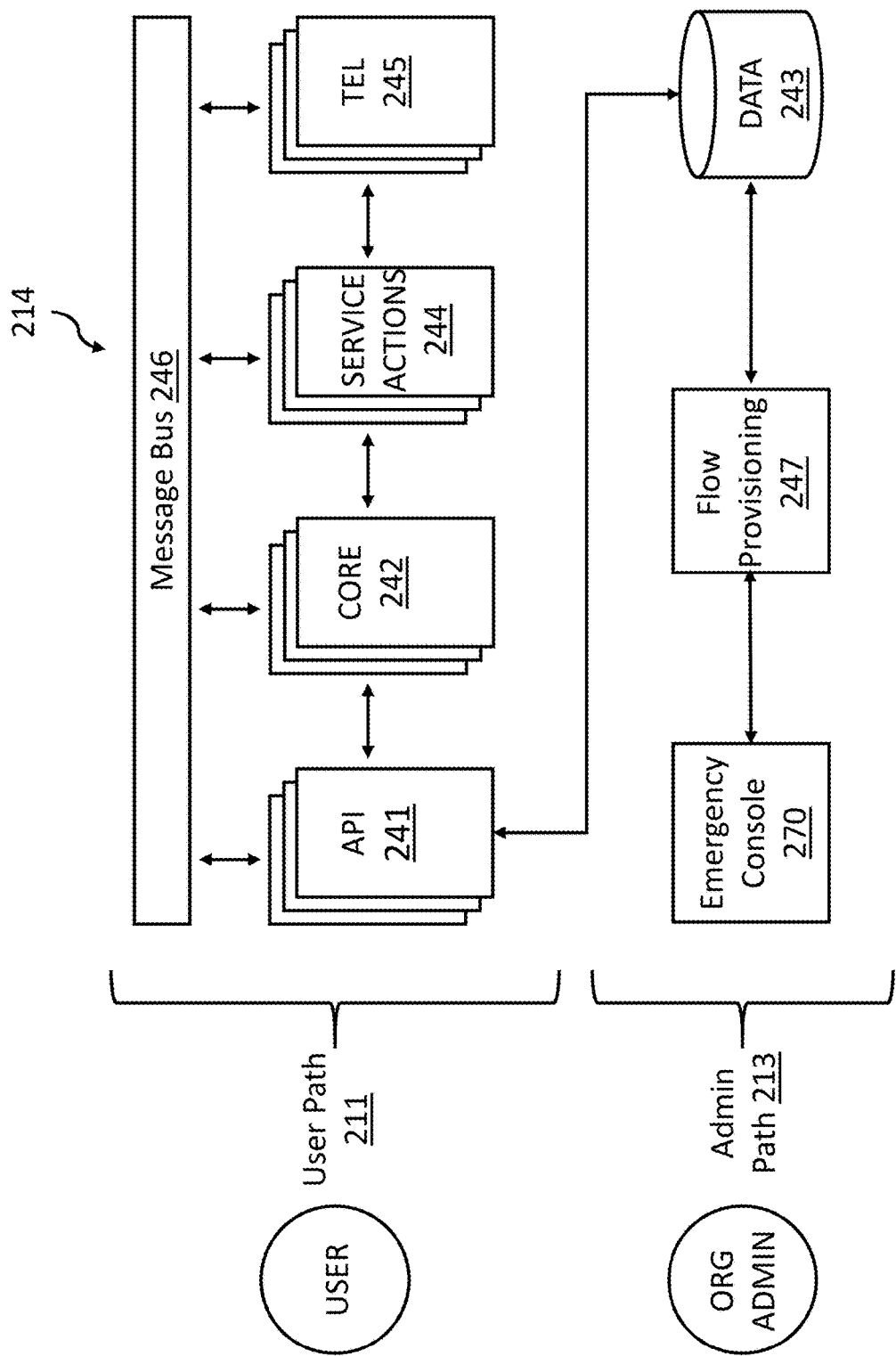
FIG. 2 depicts an exemplary emergency flow management system (EFMS), according to some embodiments of the present disclosure.

FIG. 2 depicts an exemplary embodiment of an emergency flow management system (EFMS). As depicted in FIG. 2, in some embodiments, the EFMS 214 contains two pathways: an administrator pathway 213 (admin path) and a user pathway 211 (user path). The admin path 213 is initiated by an administrator of a device or application, as described above. In the admin path, the administrator accesses an emergency flow editor 270 to configure an emergency flow to fir the needs of the administrator's product or service. In some embodiments, in the admin path, an emergency flow provisioning module 247 compiles the emergency flow into an emergency flow script, assigns an emergency flow ID to the emergency flow script, and stores the emergency flow script within a data module 243. Finally, the EFMS provides the administrator with an emergency flow trigger script including the emergency flow ID, which the administrator can integrate into their device or application. The user path 211 is initiated by a user, or a device associated with a user, of the product or service provided by the administrator. In some embodiments, in the user path, the API module 241 receives an electronic notification including the emergency flow ID from a device or application that the administrator has integrated the emergency flow trigger script into. In some embodiments, the API module 241 then references the data module 243 with the emergency flow ID to identify the emergency flow script corresponding to the emergency flow ID and delivers the emergency flow script to the core module 242 for execution. In some embodiments, the core module 242 then employs the service actions module 244 and the telephony module 245 to execute the various functions included in the emergency flow script. In some embodiments, the API module 241, the core module 242, the service actions module 244, and the telephony module 245 are separately and simultaneously in communication with the message bus 246, which facilitates and coordinates synchronous and asynchronous communication functions (e.g., a communication bridge, text messages, etc.) between the modules and various users and accounts (e.g., a user, emergency contacts, emergency responders, etc.). In some embodiments, the electronic notification including the emergency flow ID also contains emergency data, such as user data, location data, or any other additional data, according to the administrator's use case. In some embodiments, emergency data ingested by the EFMS 214 is received and shared by the emergency clearinghouse, as described above.

Emergency Response Application

As mentioned above, in some embodiments, data and information is shared between the emergency response data platform (ERDP) and an emergency service provider (ESP) through an emergency response application. In some embodiments, as described in further detail below, the emergency response application may additionally be provided to an ESP to: a) facilitate communications between the ESP and an emergency caller (e.g., a person requesting emergency assistance) or b) facilitate communications between the ESP and one or more other ESPs. In some embodiments, the emergency response application is a software application either installed on a computing device at the ESP or accessed via the internet through a web browser on the computing device (e.g., the emergency response application is hosted on a cloud computing system by the ERDP). In some embodiments, the emergency response application functions to both facilitate a two-way communication link between the ERDP and the ESP and visualize data (e.g., emergency data) received by the ESP from the ERDP. The emergency response application optionally includes various components, such as a frontend application (hereinafter "graphical user interface" or "GUI"), a backend application, an authorization module, and a user database. In some embodiments, the emergency response application additionally or alternatively includes a credential management system or a geofence system (which may include or be otherwise communicatively coupled to a credentials database or a geofence database). In some embodiments, the credential management system and the geofence system are external to the emergency response application and communicatively coupled to the emergency response application (e.g., the credential management system or geofence system can be housed or hosted on a cloud computing system by the ERDP). Any or all of the components of the emergency response application may be hosted on a cloud computing system by the ERDP, a computing device at an ESP, or some combination thereof.

In some embodiments, the emergency response application is a webpage or web application that can be accessed through an internet or web browser. In such embodiments, the emergency response application can be quickly and easily integrated into the systems used by emergency service providers (ESPs), such as public safety answering points (PSAPs), because accessing and using emergency response application requires no additional software or hardware outside of standard computing devices and networks. As previously discussed, one of the greatest hinderances that PSAPs face in providing emergency assistance to people experiencing emergency situations is in acquiring accurate locations of the emergencies and the people involved, because PSAPs are currently typically limited to verbally asking for and verbally receiving locations from callers. In some embodiments, the clearinghouse is capable of receiving accurate locations (as well as additional emergency data, as described above) from electronic devices such as smartphones and delivering the accurate locations to the appropriate PSAPs during emergency situations. Therefore, it is advantageous to provide the emergency response application to PSAPs in the form of a webpage accessible through a standard web browser, in order to provide the potentially life-saving information stored within the clearinghouse to those capable of providing emergency assistance as quickly and easily as possible. However, in some embodiments, the emergency response application is a software application installed on a computing device at an ESP. The emergency response application may be provided by the ERDP or by a third-party.

Figure 3:
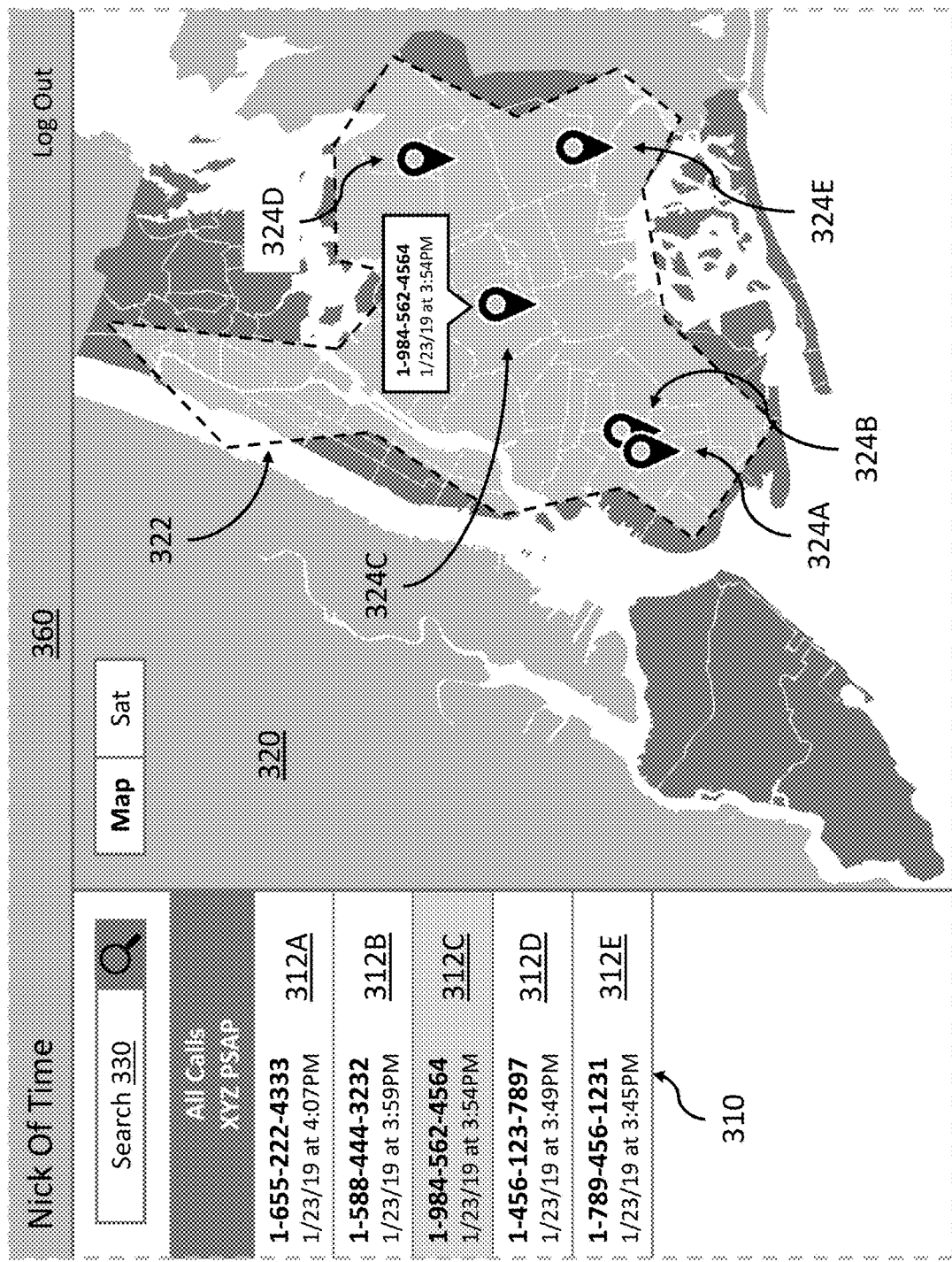
FIG. 3 illustrates an exemplary graphical user interface (GUI) provided by an emergency response application, according to some embodiments of the present disclosure.

FIG. 3 illustrates an embodiment of a graphical user interface (GUI) provided by an emergency response application 360. In some embodiments, the GUI provides interactive elements that allow a user at an ESP to receive data from the ERDP, visualize data received from the ERDP, and transmit data to the ERDP. For example, in some embodiments, the GUI includes an entry field 330 through which a user can submit a device identifier, such as by typing or pasting the device identifier into the entry field 330. In some embodiments, after submitting a device identifier through the entry field 330, the user can prompt the emergency response application to generate and send an emergency data request by selecting a search button. The emergency response application 360 then generates an emergency data request including the device identifier and any other necessary information (e.g., a temporary access token) and transmits the emergency data request to the ERDP. The ERDP can then return any available emergency data associated with the device identifier to the emergency response application 360, as described above and below. In another example, in some embodiments, the emergency response application 360 can automatically receive emergency data from the ERDP for emergencies relevant to an ESP (e.g., emergencies located within the jurisdiction of the ESP) without requiring a user to generate an emergency data request, as described above and below. After receiving emergency data from the ERDP, the emergency response application 360 can then visualize the emergency data within the GUI of the emergency response application 360. For example, in some embodiments, the emergency response application 360 includes a list of incidents 310 and an interactive map 320, as illustrated by FIG. 3. As shown, in some embodiments, when the emergency response application 360 receives a location (e.g., an emergency location) and a device identifier associated with an emergency occurring within the jurisdiction 322 of the receiving ESP, the emergency response application 360 displays the location associated with the emergency within the interactive map 320 as a location marker 324 (also referred to as an "incident location") and displays the device identifier associated with the emergency within the list of incidents 310 as an incident 312.

In addition to emergency locations, the emergency response application 360 can receive and visualize numerous types of emergency data from the ERDP. For example, the emergency response application 360 can receive additional data regarding an emergency, such as demographic or medical data associated with a person involved in the emergency (e.g., an emergency caller). In another example, the emergency response application 360 can receive data from sensors associated with the emergency, such as heart-rate data collected by a sensor on an emergency caller's smartwatch. Or, for example, the emergency response application 360 can receive data regarding emergency response assets available for an emergency, as described below. In some embodiments, the emergency response application receives and visualizes messages received from emergency callers or other ESPs, as described below. The emergency response application 360 can visualize any emergency data received from the ERDP within the GUI of the emergency response application.

Emergency Data Transmission

FIGS. 4A and 4B depict systems and processes for receiving and transmitting emergency data by an emergency response data platform in accordance with some embodiments of the present disclosure. As described above, in some embodiments, an emergency response data platform (ERDP) maintains a clearinghouse that obtains and shares emergency data to aid emergency service providers (ESPs) in responding to emergencies. For example, as depicted in FIG. 4A, during an emergency, an ESP 430A can send a query for emergency data (also referred to as an "emergency data request") to the ERDP 410 (e.g., through an emergency response application 460A, as described above) for a particular emergency, and, in response, the ERDP 410 can send any available emergency data associated with the emergency back to the ESP 430A (such as through emergency response application 460A). In some embodiments, as described above, the emergency response application 460A includes an identifier associated with an emergency alert in the emergency data request. The ERDP 410 can then use the identifier associated with the emergency alert to retrieve emergency data associated with the emergency alert from the clearinghouse 420. For example, as described above, an ESP 430A (e.g., a public safety answering point (PSAP)) can receive an emergency alert in the form of a 9-1-1 phone call 432 (representative of an emergency or potential emergency) from a mobile phone 400A associated with a phone number (e.g., (555) 555-5555). The ESP 430A can then send an emergency data request including the phone number (i.e., the identifier associated with the emergency alert) to the ERDP 410, which can then retrieve any emergency data within the clearinghouse 420 associated with the phone number and return the available emergency data to the requesting ESP 430A. This process of returning emergency data to an ESP in response to an emergency data request is referred to as "pulling" emergency data from the clearinghouse.

As described above, in some embodiments, the emergency response data platform (ERDP) can "push" emergency data from the Emergency Clearinghouse to emergency service providers (ESPs), such as by using an emergency data subscription system (hereinafter, "subscription system"). FIG. 4B depicts a flow diagram of a process for pushing emergency data from the Emergency Clearinghouse to one or more ESPs. In some embodiments, a member of an ESP (e.g., a PSAP staff member) logs into the emergency response application 460B at an ESP system 430B (e.g., a computing device associated with the ESP) by accessing the emergency response application 460B (e.g., by navigating to the emergency response application 460B through a web browser) and submitting their login information through the GUI of the emergency response application 460B. In some embodiments, when the ESP member logs into the emergency response application 460B by submitting their login information, the emergency response application 460B or ERDP 410 then determines an ESP account ID associated with the ESP member's account and establishes a persistent or active communication link (e.g., a websocket connection) with the ESP system 430B, thereby automatically subscribing the ESP console to the ESP account ID for the duration of their login session. Then, as described above, when the ERDP 410 receives an emergency alert including a location (e.g., when an emergency call is made from an electronic device 400B and sends an emergency alert to the ERDP 410 including a location generated by the electronic device 400B), the ERDP 410 retrieves a geofence associated with every ESP registered with the ERDP 410 and determines if the location falls within any of the geofences. In response to determining that the location falls within a geofence associated with the ESP associated with the ESP account ID, the ERDP 410 then associates the location with the ESP account ID, determines if there are any active or persistent communication links between the ERDP 410 and any computing devices subscribed to the ESP account ID. In this instance, because the ESP system 430B is subscribed to the ESP account ID and actively linked to the ERDP 410 through the persistent or active communication link, the ERDP 410 automatically pushes (e.g., from the clearinghouse) the emergency alert or emergency data associated with the emergency alert (e.g., the location, a phone number, etc.) to the ESP system 430B for display within the emergency response application 460B. In some embodiments, emergency alerts or emergency data associated with emergency alerts that have been pushed to an ESP are displayed within a jurisdictional awareness view, as described below.

For example, ESP system 430B and ESP system 430C are two different ESP consoles associated with the same ESP (e.g., two computing devices at the same public safety answering point (PSAP)), PSAP A. ESP system 430D is associated with a second ESP, PSAP B. One day, PSAP call-takers access and successfully log into the emergency response application 460 (emergency response application 460D-460D) at each of the three ESP system (ESP systems 430B-430D), thereby establishing three separate active communication links, one active communication link between the ERDP 410 and each of the three ESP consoles. The ESP consoles are automatically subscribed by the ERDP 410 to the ESP account IDs associated with their respective ESPs (ESP ID A for PSAP A and ESP ID B for PSAP B). Both PSAP A and PSAP B are associated with only one geofence, geofence A and geofence B, respectively. Geofences A and B do not overlap, especially for primary agencies which have authoritative jurisdiction. The geofences have previously been tagged within the ERDP 410 with their respective ESP account IDs (e.g., during a registration process for the emergency response application). It is contemplated that an ESP (e.g., a PSAP) may be associated with one or more geofences or sub-geofences. For example, the area where emergency calls may be made versus another area where text messages to 911 may be made. In another example, an ESP agency may have a specific geofence for responding to specific type of emergency, e.g., medical emergency geofence.

Later that day, an emergency call is made from communication device 400B, which causes communication device 400B to generate a first emergency alert including a first location of the communication device 400B and transmit the first emergency alert to the ERDP 410. When the ERDP 410 receives the first emergency alert, the ERDP 410 retrieves some or all of the geofences stored within the ERDP 410 and determines if the first location falls within any of the geofences stored within the ERDP 410. In this example, the ERDP 410 determines that the first location falls within geofence A, associated with PSAP A. In response, the ERDP 410 tags the first location with the ESP account ID associated with geofence A, ESP ID A. The ERDP 410 then determines if there are any active communication links between the ERDP and any ESP consoles subscribed to ESP ID A and automatically pushes (e.g., from the clearinghouse) the first emergency alert to those ESP consoles. In this example, both ESP system 430B and ESP system 430C are subscribed to ESP ID A, so the ERDP 410 automatically pushes the first emergency alert to both ESP system 430B and ESP system 430C for display within emergency response applications 460B and 460C, respectively, such as through a jurisdictional awareness view (as described below). The first location does not fall within geofence B, because geofence A and geofence B do not overlap, so the first emergency alert is not pushed to ESP system 430D, even though an active communication link has been established between the ERDP 410 and ESP system 430D.

Three minutes later, the ERDP 410 receives an emergency alert from electronic device 400D (e.g., a home security system) including a second location of the electronic device 400D. When the ERDP 410 receives the second emergency alert, the ERDP again retrieves some or all of the geofences stored within the ERDP 410 and determines if the second location falls within any of the geofences stored within the ERDP 410. In this example, the ERDP 410 determines that the second location falls within geofence B, associated with PSAP B. In response, the ERDP 410 tags the second location within the ESP account associated with geofence B, ESP ID B and automatically pushes the second emergency alert to ESP system 430D for display within emergency response application 460D, because ESP system 430D has an active communication link established with the ERDP 410 and ESP system 430D is subscribed to ESP ID B. The ERDP 410 does not push the second emergency alert to ESP system 430B or ESP system 430C. Although ESP system 430B and ESP system 430C have active communication links established with the ERDP 410, they are not subscribed to ESP ID B, and geofence A and geofence B do not overlap, meaning the second location does not fall within geofence A. Two minutes after that, the ERDP 410 receives an emergency alert from electronic device 400C (e.g., an intelligent vehicle system) including a third location of the electronic device 400C. The ERDP 410 determines that the third locations falls within geofence A (like the first location included in the first emergency alert) and thus automatically pushes the third emergency alert to both ESP system 430B and ESP system 430C for display within emergency response application 460B and 460C. In some embodiments, emergency response application 460B and emergency response application 460C display the first emergency alert and the third emergency alert simultaneously, such as through a jurisdictional awareness view, as described below.

Jurisdictional Awareness View

In some embodiments, the systems, applications, servers, devices, methods, and media of the instant application provide a jurisdictional awareness view within the emergency response application. In some embodiments, the jurisdictional awareness view enables an ESP to view one or more ongoing or recently received emergency alerts (e.g., emergency calls) within one or more geofenced jurisdictions. Although not shown, electronic emergency alerts based on alarms or sensors, activation of a panic button, etc. may be displayed in a similar fashion wherein the emergency alerts are not emergency calls. FIG. 3 illustrates the jurisdictional awareness view displayed within the emergency response application, in accordance with one embodiment of the present disclosure. In some embodiments, the jurisdictional awareness view includes a list of incidents 310 that displays one or more incidents 312 associated with one or more device identifiers (e.g. phone numbers, IP addresses). In some embodiments, the jurisdictional awareness view additionally or alternatively includes an interactive map 320 that displays one or more incident locations 324 associated with the one or more incidents 312 associated with the one or more device identifiers, as described below. In some embodiments, the jurisdictional awareness view displays incidents and incident locations only for emergencies occurring within the jurisdiction 322 of the ESP at which the emergency response application 360 is being accessed.

For example, in the example illustrated in FIG. 3, an ESP has accessed an emergency response application 360 provided by the ERDP. In this example, the ERDP has pushed emergency data associated with five different emergency alerts to the ESP (as described above) through the emergency response application 360. Accordingly, the emergency response application 360 displays five different incidents 312 (e.g., incidents 312A-312E) within the list of incidents 310 and five corresponding incident locations 324 (e.g., incident locations 324A-324E) within the interactive map 320. As illustrated by FIG. 3, in some embodiments, incidents 312 and incident locations 324 may be selected or hovered over to highlight a particular incident 312. In this example, incident 312C and its corresponding incident location 324C have been selected and highlighted. In some embodiments, selecting a particular incident 312 or corresponding incident location 324 prompts the emergency response application 360 to display additional information associated with the particular incident 312 (e.g., additional emergency data or information associated with the emergency alert for which the particular incident 312 was created). Because the jurisdictional awareness view can show an ESP numerous incidents 312 occurring within the jurisdiction 322 of the ESP simultaneously, the jurisdictional awareness view can provide the ESP with situational awareness that the ESP otherwise would not have. For example, with the knowledge that incidents 312A and 312B originated in close proximity and at approximately the same time, an ESP personnel (e.g., a call taker at a public safety answering point) can determine that the two incidents may be related.

Emergency Communication Translation

Figure 5:
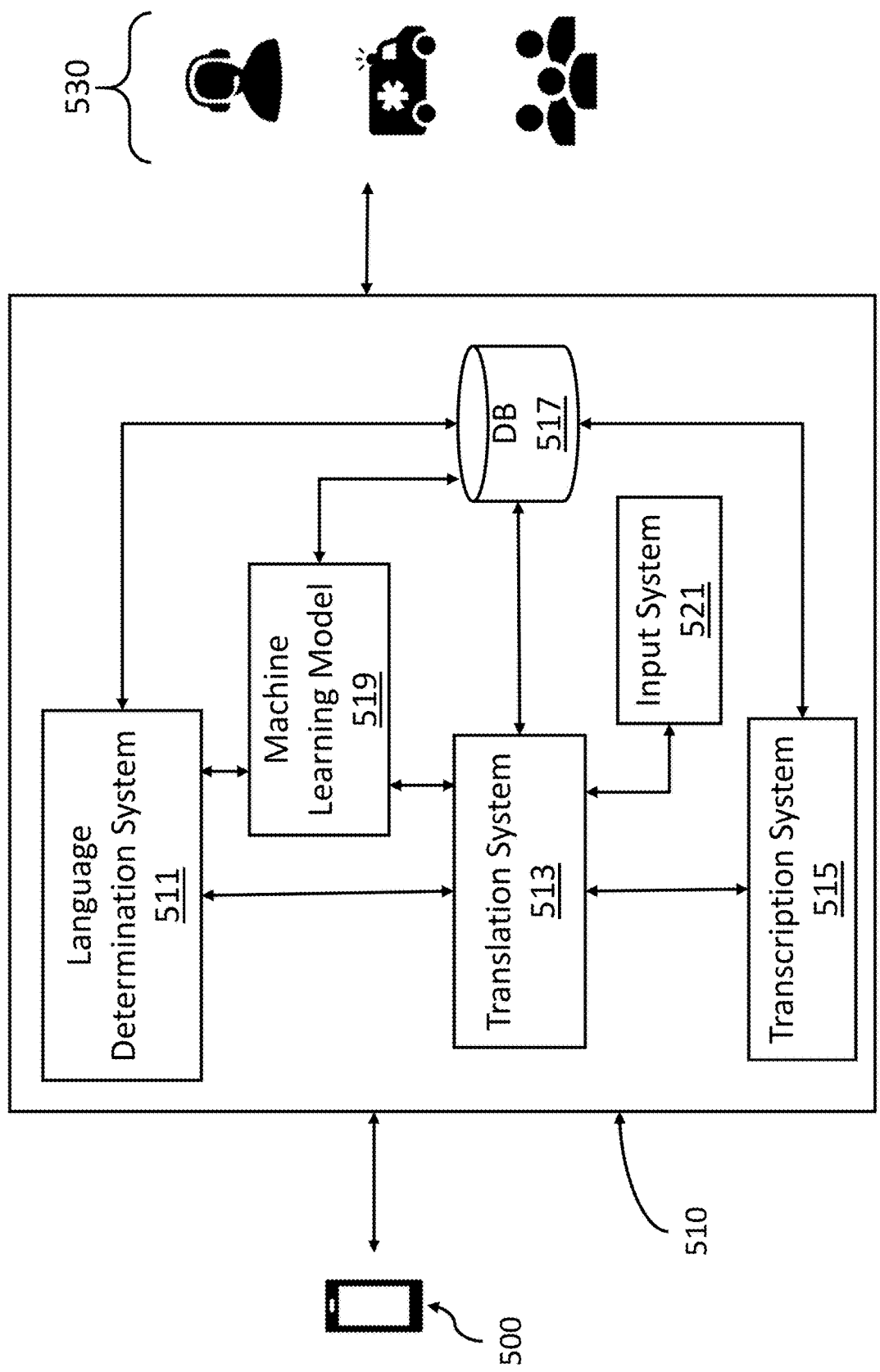
FIG. 5 depicts a diagram of an emergency response data platform for providing emergency communication translation and functions, in accordance with some embodiments of this disclosure.

FIG. 5 depicts a diagram of an emergency response data platform for providing emergency communication translation and functions, in accordance with some embodiments of this disclosure. As illustrated in FIG. 5, emergency data source 500 can communicate with emergency response data platform (ERDP) 510. For example, emergency data source 500 can send an emergency communication to ERDP 510 to be forwarded to emergency service provider (ESP) 530. According to some embodiments, emergency data source 500 can be similar to emergency data source 100 of FIG. 1. Also, ESP 530 can be similar to ESP 130 of FIG. 1. ERDP 510 can be similar to ERDP 110 of FIG. 1 and can further include additional systems and capabilities to provide emergency communication translation.

According to some aspects, the emergency communication from emergency data source 500 can be in a language different from a standard language of ERDP 510 and/or ESP 530. ERDP 510 can be configured to determine a language associated with the emergency communication that ERDP 510 receives from, for example, emergency data source 500. In some embodiments, ERDP 510 is configured to translate the emergency communication from the determined language to the standard language and is configured to send the translated emergency communication to ESP 530. Additionally, or alternatively, ERDP 510 may be configured to generate a summary of the emergency communication that ERDP 510 receives. ERDP 510 may be configured to send the summary of the emergency communication to ESP 530. In some embodiments, the summary of the emergency communication is in the standard language and can include one or more emergency keywords. In some embodiments, the summary of the emergency communication can include one or more codes associated with the emergency communication. For example, the emergency code may be a dispatch code for specific type or priority of an emergency, e.g., a residential fire or a burglary, etc. The one or more codes can be associated with the emergency communication. In some embodiments, the one or more codes can be in the standard language and can be associated with the one or more emergency keywords. Additionally, or alternatively, ERDP 510 can be configured to determine, based on the determined language of the emergency communication, a specialized language line associated with ESP 530 and can be configured to send the emergency communication (e.g., without translation) to the specialized language line.

Similarly, ERDP 510 can be configured to receive a communication from ESP 530, which can be in the standard language. ERDP 510 can translate the communication from ESP 530 to the determined language from emergency data source 500. ERDP 510 can then transmit the translated communication (e.g., from the standard language to the determined language) back to emergency data source 500. Some embodiments of this disclosure are discussed with respect to the English language as the standard language. However, it is noted that the embodiments of this disclosure are not limited to these examples, and the standard language can include other languages. In other words, the embodiments of this disclosure can translate any first language of an emergency communication (e.g., from emergency data source 500 to ERDP 510) to any second language (e.g., a language of ESP 530) or vice versa.

According to some embodiments, ERDP 510 can include language determination system 511, translation system 513, transcription system 515, database 517, machine learning model 519, and input system 521. It is noted that ERDP 510 can include additional systems, for example, as discussed with respect to FIG. 1. Additionally, or alternatively, ERDP 510 can include fewer systems and/or a combination of different systems.

According to some embodiments, language determination system 511 can be configured to receive the emergency communication from emergency data source 500. In some examples, the emergency communication can include at least one of a short message service (SMS) message, an internet-based message, all or portions of an emergency call, a recorded audio/video feed, a live audio/video feed, or the like. In some examples, the emergency call can include a landline call, a cellular line call, a Voice over Internet Protocol (VoIP) call, or the like.

According to some embodiments, language determination system 511 can be configured to determine (or predict) the language of the emergency communication that language determination system 511 receives from emergency data source 500. Additionally, or alternatively, language determination system 511 can be configured to determine (or predict) that the language of the emergency communication is different from a standard language. For example, to determine (or predict) the language of the emergency communication, language determination system 511 can store all or a portion of the emergency communication in, for example, a memory or database 517. In some embodiment, if the received emergency communication is voice data (e.g., a voice call), language determination system 511 can convert the portion (or all) of the emergency communication to text data. Using the text data, language determination system 511 can determine (or predict) that the language of the emergency communication is different from the standard language and/or can determine (or predict) what the language of the emergency communication is. In a non-limiting example, language determination system 511 can use a Google Translation Application Programming Interface (API) and/or Google Cloud Translation API for determining the language of the emergency communication. However, the embodiments of this disclosure are not limited to this example and language determination system 511 can use other methods and systems to determine the language of the emergency communication.

In some embodiments, when language determination system 511 determines (or predicts) the language of the emergency communication, language determination system 511 can generate a probability value indicating a confidence level that the determined (or predicted) language is an accurate language of the emergency communication. Additionally, or alternatively, when language determination system 511 that the language of the emergency communication is different from a standard language, language determination system 511 can generate a probability value indicating a confidence level that the language of the emergency communication is different from a standard language. ERDP 510 can send the probability value to ESP 530 (and/or emergency data source 500) along with translated emergency communication, determined (or predicted) language, and/or translated response from ESP 530.

According to some embodiments, language determination system 511 can compare the received emergency communication and its associated determined (or predicted) language with emergency communications and their associated determined (or predicted) languages in database 517 to determine the probability value indicating the confidence level that the determined (or predicted) language is an accurate language of the emergency communication. Additionally, or alternatively, language determination system 511 can provide (e.g., display) the received emergency communication and its associated determined (or predicted) language to an administrator of ERDP 510 (or other users) to validate that the determined (or predicted) language is accurate. In some embodiments, language determination system 511 can store a portion of (or all of) the emergency communication, the determined (or predicted) language, and the determined probability in database 517 for further use. In some embodiments, language determination system 511 can use a portion of (or all of) the emergency communication, the determined (or predicted) language, and the determined probability to train or update an algorithm of machine learning model 519 to assist language determination system 511 to determine (or predict) a language of the emergency communication (or to determine that the language of the emergency communication is different from the standard language) with higher probabilities.

In some embodiments, the language determination system 511 will make a prediction of the language of the caller as emergency calls are coming in based on various factors including prior call history, demographics of the area, device language settings, etc. For example, emergency calls that are coming in with a language different from the standard language can be flagged (e.g., Spanish caller within an English-speaking agency). In some embodiments, the predicted "non-standard" emergency calls may be diverted to specific call-takers (e.g., a call taker with dual-language skills). In some embodiments, the "non-standard" emergency call takers may be provided additional for translation, summary generation, and other tools.

In some embodiments, after determining (or predicting) the language of the emergency communication (and/or determining that the language of the emergency communication is different from the standard language), language determination system 511 can display the determined language at ERDP 510 and/or ESP 530. Additionally, language determination system 511 can display the determined probability indicating the confidence level associated with the determined language at ERDP 510 and/or ESP 530.

After determining (or predicting) the language of the emergency communication (and/or determining that the language of the emergency communication is different from the standard language), translation system 513 can translate the emergency communication from the determined language to the standard language, according to some embodiments. In some embodiments, translation system 513 can use the converted text data from language determination system 511 and/or database 517. Translation system 513 can translate the converted text data from the determined language to the standard language and can generate a translated text data. The second text data is in the standard language. In a non-limiting example, translation system 513 can use a Google Translation API and/or Google Cloud Translation API for translating the emergency communication. However, the embodiments of this disclosure are not limited to this example and translation system 513 can use other methods and systems to translate the emergency communication.

In some embodiments, when translation system 513 translates the emergency communication, translation system 513 can generate a probability value indicating a confidence level that the translated emergency communication is an accurate translation of the emergency communication. ERDP 510 can send the probability value to ESP 530 (and/or emergency data source 500) along with the translated emergency communication, determined (or predicted) language, and/or translated response from ESP 530.

According to some embodiments, translation system 513 can compare the received emergency communication and its translation with emergency communications and their translations in database 517 to determine the probability value indicating the confidence level that translated emergency communication is an accurate translation of the emergency communication. Additionally, or alternatively, translation system 513 can provide (e.g., display) the received emergency communication and its translation to an administrator of ERDP 510 (or other users) to validate that the translation is accurate. In some embodiments, language determination system 511 can store a portion of (or all of) the emergency communication, a portion of (or all of) the translated emergency communication, and the determined probability in database 517 for further use. In some embodiments, translation system 513 can use a portion of (or all of) the emergency communication, a portion of (or all of) the translated emergency communication, and the determined probability to train or update an algorithm of machine learning model 519 to assist translation system 513 to determine (or predict) the translation of the emergency communication with higher probabilities.

Translation system 513 can communicate the translated emergency communication and/or the determined probability value indicating the confidence level of the translation to ESP 530. In some embodiments, translation system 513 can store the translated text data in a memory and/or database 517, where transcription system 515 can access. Additionally, or alternatively, translation system 513 can directly send the translated text data to transcription system 515.

Transcription system 515 can generate a transcription that is communicated to ESP 530. For example, the generated transcription (and/or the translated text data) can be sent to a computer aided dispatch (CAD) system or a record management system (RMS) of, for example, ESP 530. Additionally, or alternatively, the generated transcription (and/or the translated text data) can be displayed on a graphical user interface (GUI) of an emergency response application.

In some embodiments, to communicate the translated emergency communication to ESP 530, translation system 513 and/or transcription system 515 can convert the translated text data to voice data, where the voice data is in the standard language. Translation system 513 and/or transcription system 515 can then communicate the translated voice data to ESP 530.

According to some embodiments, in addition to, or alternative to, translating all (or a portion of) the received emergency communication, translation system 513 can generate a summary of the received emergency communication, where the summary is in the standard language. Additionally, translation system 513 can generate a probability value indicating a confidence level that generated summary is an accurate summary of the emergency communication. In some examples, translation system 513 can generate the probability value indicating the confidence level in the similar manners discussed above. Translation system 513 can communicate the summary of the emergency communication and/or the determined probability value indicating the confidence level of the summary to ESP 530. Additionally, or alternatively, translation system 513 can display the summary of the emergency communication and/or the determined probability value indicating the confidence level of the summary at ERDP 510.

According to some embodiments, the summary of the emergency communication can include one or more emergency keywords in the standard language. For example, translation system 513 can determine one or more emergency keywords in the received emergency communication and translate the determined one or more emergency keywords to generate the summary. In another example, translation system 513 can translate the received emergency communication and then choose one or more emergency keywords from the translated emergency communication to generate the summary. The emergency keywords can be stored in database 517. In another example, translation system 513 can use machine learning model 519 to determine the emergency keyword. Translation system 513 further train and/or update machine learning model 519 with new emergency keywords.

Additionally, or alternatively, the summary of the emergency communication can include one or more codes associated with the emergency communication. For example, translation system 513 can determine one or more emergency keywords in the received emergency communication and use the determined emergency keywords to generate (or determine) one or more codes. In another example, translation system 513 can translate the received emergency communication, then determine one or more emergency keywords from the translated emergency communication, and then use the determined emergency keywords to generate (or determine) one or more codes to generate the summary. The codes can be stored in database 517. In another example, translation system 513 can use machine learning model 519 to determine the codes. Translation system 513 further train and/or update machine learning model 519 with new codes. In some embodiments, the one or more codes can be in the standard language and be associated with the emergency communication. In some embodiments, the one or more codes can be in the standard language and can be associated with the one or more emergency keywords.

Although some of the operations of ERDP 510 is discussed with respect to translating the emergency communication from emergency data source 500 towards ESP 530, the embodiments of this disclosure can also include similar operations for translating communications from ESP 530 towards emergency data source 500. In other words, all or a portion of operations discussed above can be used for translating communications from ESP 530 towards emergency data source 500. In some embodiments, ERDP 510 can perform the translation operations in real-time or in near real-time.

In one exemplary embodiments, ERDP 510 can include (or be coupled) to an input system 521. ESP 530 can use input system 521 to provide a response to the emergency communication. For example, after receiving the translated emergency communication, ESP 530 can provide a response to emergency data source 500. ESP 530 can use input system 521 to provide the response. In some embodiments, input system 521 provides a response in the standard language, which can be translated using translation system 513 to the language of emergency data source 500 and can be provided to emergency data source 500. Additionally, or alternatively, input system 521 can provide responses based on the language determined by language determination system 511. In other words, when language determination system 511 determines (or predicts) the language of the emergency communication received from emergency data source 500, input system 521 can use the determined (or predicted) language to customize the response to the emergency communication.

In some embodiments, input system 521 can have (or have access to) pre-determined responses that ESP 530 can choose from. For example, input system 521 can have a menu of responses that ESP 530 can choose from. In some embodiments, input system 521 can show different lists of pre-determined responses based on the language determined (or predicted) by language determination system 511. Additionally, or alternatively, input system 521 can let ESP 530 enter (e.g., type in) its response.

In some embodiments, ERDP 510 can sample predetermined portions of the received emergency communication, translate the sampled portions, and communicate the translated portions to ESP 530. Additionally, or alternatively, ERDP 510 can determine a condition in the received emergency communication for storing, translating, communicating the translated emergency communication to ESP 530. In a non-limiting example, a gap of T seconds in the emergency communication (e.g., T seconds gap in a voice call) can be the condition used by ERDP 510. T can be a predetermined and/or user-set threshold, according to some examples. In some embodiments, ERDP 510 can sample predetermined portions of the received emergency communication, determine a summary of the emergency communication, and communicate the summary to ESP 530.

According to some embodiments, ERDP 510 can receive additional information from emergency data source 500 can assist ERDP 510 in determining the language of emergency communication and/or in the translating and generating transcription operations of ERDP 510. In a non-liming example, ERDP 510 can receive information/data associated with a user and/or a user device that initiates the emergency communication. The data associated with the user and/or the user device can include, but is not limited to, location data associated with the user device, language preference data set in the user device, language setting pre-installed on the user device, preference data associated with a keyboard of the user device, predicted language based on previous emergency communications, demographics associated with a user of the user device or the like. Additionally, or alternatively, the user and/or the user device that initiated the emergency communication can indicate that the emergency communication is not in the standard language, the emergency communication is to be translated, and/or the language of the emergency communication. In some embodiments, after determining the language of the emergency communication (and/or determining that the language of the emergency communication is different from the standard language), ERDP 510 can further communicate with emergency data source 500 to confirm the determined language with, for example, a user of emergency data source 500.

According to some embodiments, data associated with the user device and/or data associated with a user of the user device can be stored in database 517. This data can be used to train and/or update machine learning model 519. Language determination system 511 can use the stored data and/or machine learning model 519 to improve its language determination and/or determine its probability value indicating a confidence level. Additionally, or alternatively, translations system 513 (and/or transcription system 515) can use the stored data and/or machine learning model 519 to improve its translation and/or determine its probability value indicating a confidence level. In a non-limiting example, a determined (or predicted) language can be associated with an identifier of a user device in databased 517 and/or machine learning model 519. If emergency communications are received that are associated with the stored identifier, ERDP 510 can determine the language of the received emergency communications with higher confidence level. In another non-limiting example, a determined (or predicted) language can be associated with a plurality of emergency communications received from an area (of, for example, a city). If emergency communications are received that are associated with that specific area, ERDP 510 can determine the language of the received emergency communications with higher confidence level. Although some examples are provided above, the embodiments of this disclosure can use other methods to use data associated with the user device, data associated with a user of the user device, demographic data, or other information to increase the confidence level of language determination and/or translation.

According to some embodiments, machine learning model 519 can use artificial intelligence and/or machine learning to improve operations of language determination system 511, translation system 513, and/or transcription system 515. The operation of ERDP 510 can include multiple phases. For example, a first phase of the operation of ERDP 510 can include a training process of machine learning model 519. A second phase of the operation of ERDP 510 can include using machine learning model 519 to determine (or predict) a language of an emergency communication, determine a confidence level associated with the determined (or predicted) language of the emergency communication, determine a translation of the emergency communication, and/or determine a confidence level associated with the translated emergency communication.

According to some embodiments, machine learning model 519 can be configured to receive, as input, the received emergency communication, the determined (or predicted) language, the confidence level associated with the determined (or predicted) language, the translated emergency communication, the confidence level associated with the translated emergency communication, and/or additional information from emergency data source 500 (e.g., information/data associated with a user and/or a user device that initiates the emergency communication.) These information/data can be used to train machine learning model 519 and/or update one or more algorithms associated with machine learning model 519.

According to some embodiments, language determination system 511 can operate with machine learning model 519 and/or database 517 to determine (or predict) a language of a received emergency communication (and/or determine that its language is different from the standard language.) According to some embodiments, translation system 513 can operate with machine learning model 519 and/or database 517 to generate a translation of the emergency communication. According to some embodiments, translation system 513 can operate with machine learning model 519 and/or database 517 to forward the received emergency communication to a specialized language line determined based on the determined (or predicted) language of the received emergency communication. According to some embodiments, transcription system 515 can operate with machine learning model 519 and/or database 517 to prepare a transcript of the translated (or untranslated) emergency communication, if needed.

According to some embodiments, after determining the language of the emergency communication (and/or determining that the language of the emergency communication is different from the standard language), ERDP 510 (e.g., using database 517) can determine a specialized language line associated with ESP 530 based on the determined language of with the emergency communication. For example, ESP 530 can include a plurality of specialized language lines for different languages. ERDP 510 can direct the emergency communication to one of the specialized language lines based on the language determine by, for example, language determination system 511.

According to some embodiments, ERDP 510 can provide load balancing for emergency communication translation. For example, separate computing resources of ERDP 510 can be used for emergency communication translation. And ERDP 510 can be configured to forward the received emergency communication to the computing resources when ERDP 510 determines that the received emergency communication is to be translated.

Figure 6A:
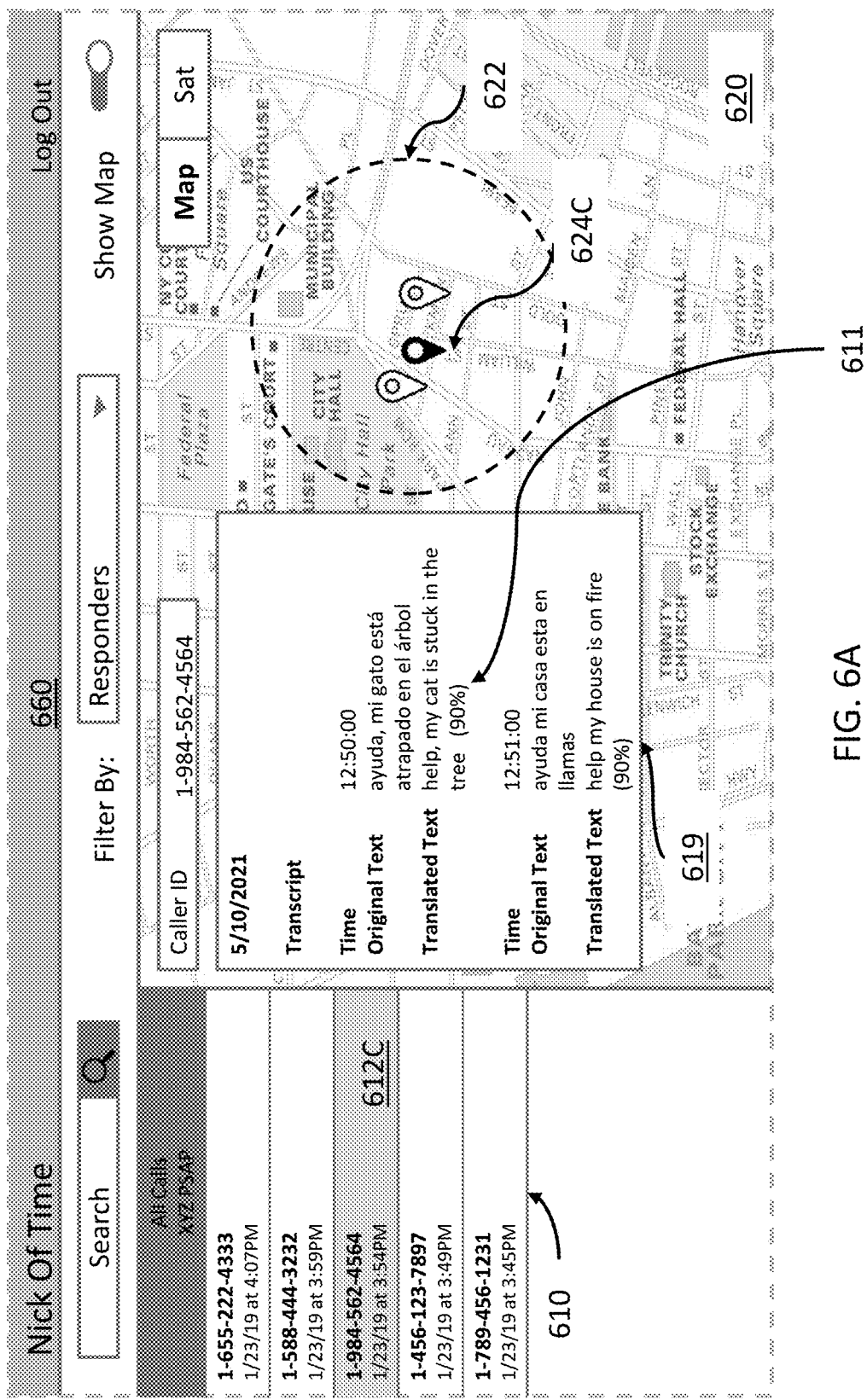
FIG. 6A illustrates an exemplary graphical user interface (GUI) provided by an emergency response application for emergency communication translation, according to some embodiments of the present disclosure.

FIG. 6A illustrates an exemplary graphical user interface (GUI) provided by an emergency response application for emergency communication translation, according to some embodiments of the present disclosure. In some examples, the emergency response application is generated and/or provided by ERDP 510. In some examples, emergency response application 660 is similar to emergency response application 360 of FIG. 3 with addition of translated transcript 619 within interactive map 620. In some examples, translated transcript 619 is associated with incident 612C of the list of incidents 610. Incident 612C has a corresponding incident location 624C (that has been selected and highlighted) within a jurisdiction 622 of the ESP.

According to some embodiments, translated transcript 619 can be displayed at ERDP 510 and/or at ESP 530. According to some embodiments, translated transcript 619 is generated and displayed using ERDP 510 as discussed in this disclosure. Translated transcript 619 can include different portions such as, but not limited to, an identifier of the emergency data source, the date, the time, the original text (e.g., in the non-standard language), the translated text (e.g., in the standard language), an indication of the determined language, a timestamp associated with recorded portion(s) of the emergency communication, and the like. According to some embodiments, translated transcript 619 can also include probability value 611 indicating a confidence level that the translated emergency communication is an accurate translation of the emergency communication.

Figure 6B:
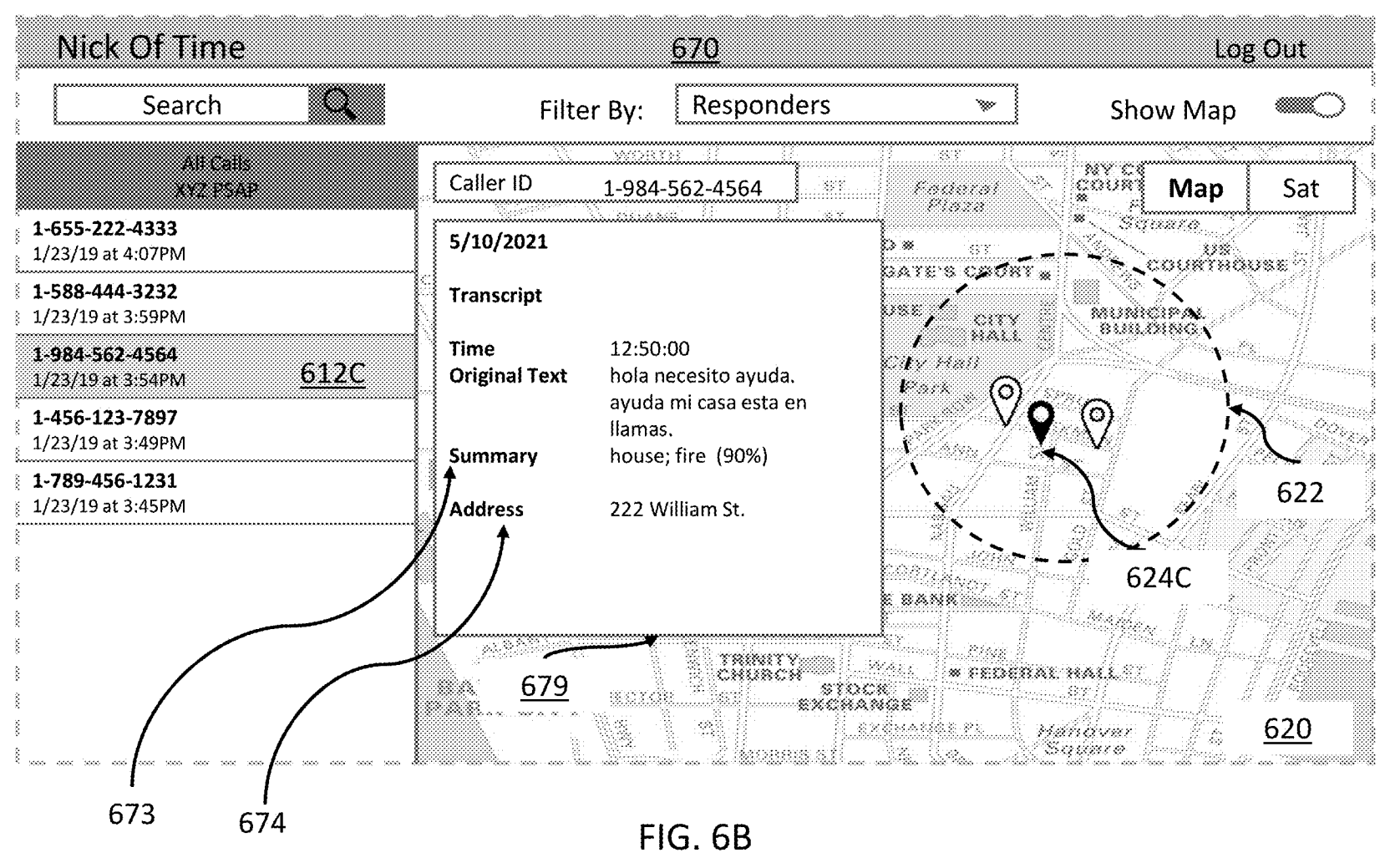

FIG. 6B illustrates another exemplary graphical user interface (GUI) provided by an emergency response application for emergency communication translation, according to some embodiments of the present disclosure. In some examples, the emergency response application can be generated and/or provided by ERDP 510. In some examples, emergency response application 670 may be similar to emergency response application 660 of FIG. 6A. Emergency response application 670 can include incident information card 679. In some examples, translated transcript 619 is associated with incident 612C of the list of incidents. Incident 612C has a corresponding incident location 624C (that has been selected and highlighted) within a jurisdiction 622 of the ESP.

According to some embodiments, translated transcript 679 can be displayed at ERDP 510 and/or at ESP 530. According to some embodiments, translated transcript 679 can be generated and displayed using ERDP 510 as discussed in this disclosure. Translated transcript 679 can include different portions such as, but not limited to, an identifier of the emergency data source, the date, the time, the original text (e.g., in the non-standard language), summary 673 (e.g., in the standard language), an indication of the determined language, a timestamp associated with recorded portion(s) of the emergency communication, address 674 associated with corresponding incident location 624C, and the like. According to some embodiments, translated transcript 679 can also include a probability value (e.g., 90% in this non-limiting example) indicating a confidence level that summary 673 is an accurate summary of the emergency communication.

As discussed above, summary 673 can include one or more keywords. In a non-limiting example, summary 673 can include "house; fire" corresponding to a received emergency communication. In another non-limiting example, summary 673 can include "gun" corresponding to a received emergency communication. Additionally, or alternatively, summary 673 can include one or more codes (e.g., shorthand codes) associated with the one or more keywords and/or associated with the received emergency communication. In a non-limiting example, summary 673 can include "residential fire" instead of (or in addition to) "house; fire." In another non-limiting example, summary 673 can include "weapon detected" instead of (or in addition to) "gun." According to some embodiments, the use of code can assist ESP 530 for classification.

Figure 6C:
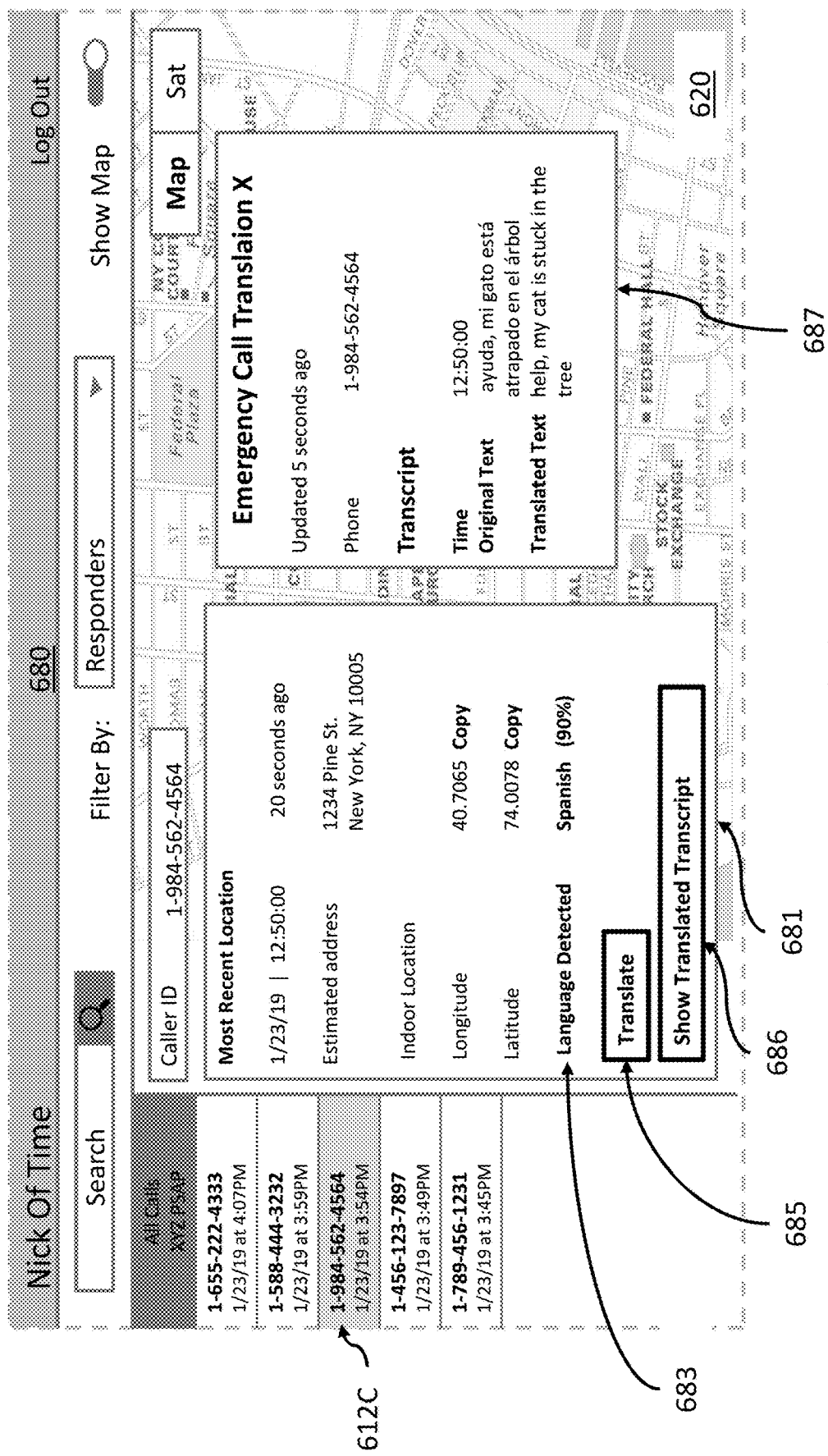
FIG. 6C illustrates another exemplary GUI provided by the emergency response application for emergency communication translation, according to some embodiments of the present disclosure.

FIG. 6C illustrates another exemplary graphical user interface (GUI) provided by an emergency response application for emergency communication translation, according to some embodiments of the present disclosure. In some examples, the emergency response application is generated and/or provided by ERDP 510. In some examples, emergency response application 680 is similar to emergency response application 660 of FIG. 6A. Emergency response application 680 can include incident information card 681 and translated transcript 687 within interactive map 620. In some examples, translated transcript 687 is associated with incident 612C. According to some embodiments, translated transcript 687 can be displayed at ERDP 510 and/or at ESP 530.

According to some embodiments, in addition to location information associated with incident 612C, incident information card 681 can include a portion 683 that indicates the language detected for the emergency communication associated with incident 612C. Additionally, portion 683 can include a probability value (e.g., 90% in this non-limiting example) indicating a confidence level that the determined (or predicted) language is an accurate language of the emergency communication. Additionally, or alternatively, incident information card 681 can include button 685 so that an operator of emergency response application 660 can use to translate the emergency communication. Additionally, or alternatively, incident information card 681 can include button 686 so that the operator of emergency response application 660 can use to show the translated transcript. In some examples, translated transcript 687 can be generated and displayed using ERDP 510 as discussed in this disclosure. In some examples, incident information card 681 and/or translated transcript 687 can be a timestamp associated with recorded portion(s) of the emergency communication.

Figure 6D:
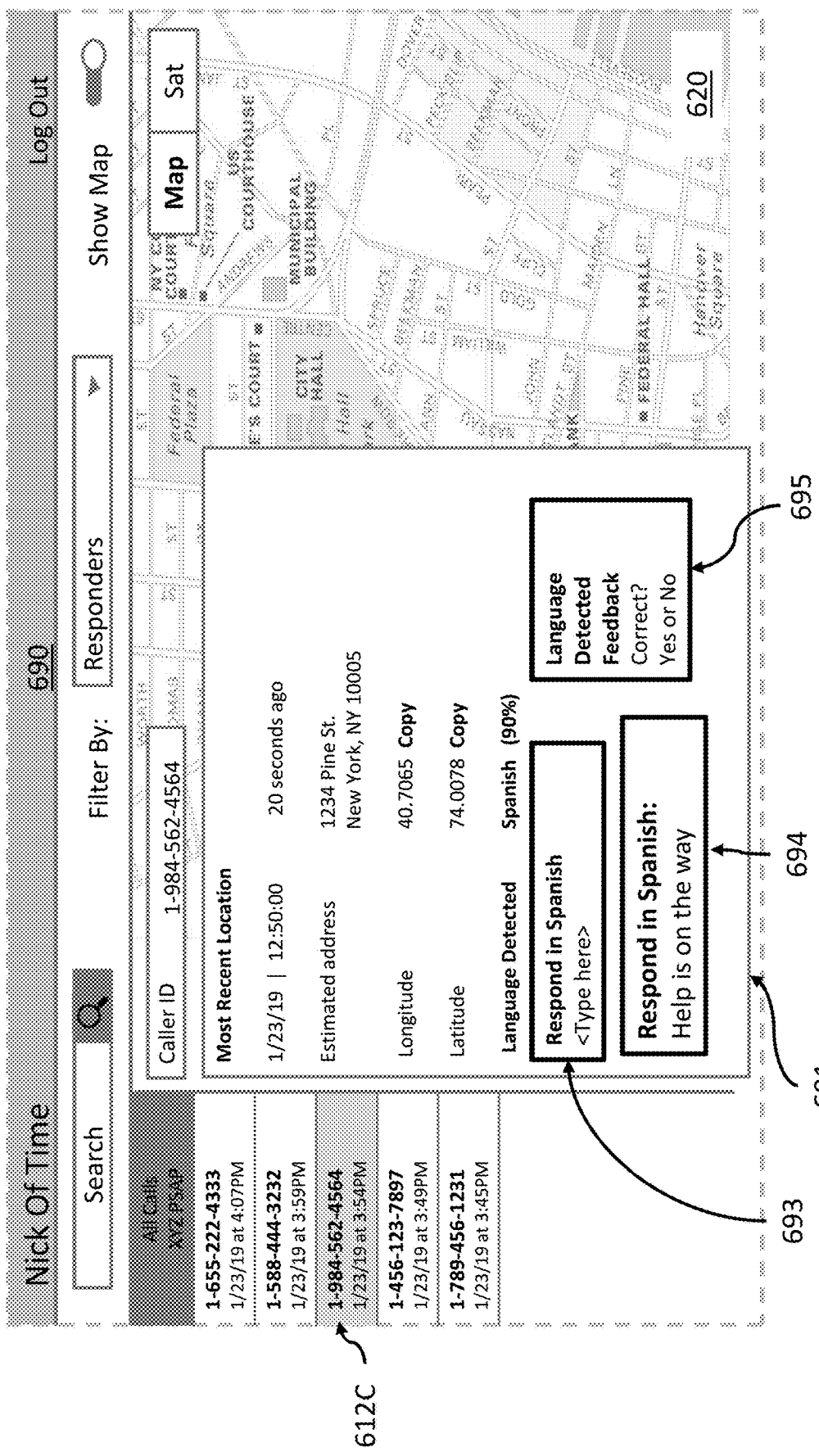
FIG. 6D illustrates another exemplary GUI provided by the emergency response application for emergency communication translation, according to some embodiments of the present disclosure.

FIG. 6D illustrates another exemplary GUI provided by the emergency response application for emergency communication translation, according to some embodiments of the present disclosure. In some examples, emergency response application 690 is generated and/or provided by ERDP 510. In some examples, emergency response application 690 is similar to emergency response application 660 of FIG. 6A. Emergency response application 690 can include incident information card 691. According to some embodiments, incident information card 691 can include one or more responses from ESP 530 and/or one or more users (e.g., call takers) from ESP 530. In some examples, the response(s) can be associated with incident 612C. According to some embodiments, the response(s) can be displayed at ERDP 510 and/or at ESP 530.

According to some embodiments, the response from ESP 530 on incident information card 691 can include box 693 for free-form responses from ESP 530 that may be translated and converted to voice and sent back to ERDP 510. In these examples, ESP 530 and/or one or more users (e.g., call takers) from ESP 530 can provide a response to the emergency communication using box 693. The response can include a text response or a voice response in a free form. The response can be in the standard language and can be converted to the determined (or predicted) language using the embodiments of this disclosure before the response is communicated back to ERDP 510. Additionally, or alternatively, the response can be in the determined (or predicted) language and the response can be communicated back to ERDP 510.

According to some embodiments, the response from ESP 530 on incident information card 691 can include box 694 for an option for form (e.g., predetermined) responses from ESP 530. In these examples, emergency response application 690 can have access to the predetermined responses. The predetermined responses can be in the standard language and/or can be in the determined (or predicted) language. The predetermined responses can be stored in, for example, database 517. Depending on the received emergency communication (and/or its translation), ESP 530 and/or one or more users (e.g., call takers) from ESP 530 can choose an appropriate response in box 694 from the predetermined responses. In some embodiments, if the chosen response is in the standard language, the response can be converted to the determined (or predicted) language using the embodiments of this disclosure before the response is communicated back to ERDP 510. In some embodiments, if the chosen response is in the determined (or predicted) language, the response can be communicated back to ERDP 510. In some embodiments, the response can be converted to voice and sent back to ERDP 510.

According to some embodiments, incident information card 691 can include language detected feedback box 695. According to some embodiments, ESP 530, one or more users (e.g., call takers) from ESP 530, and/or other user(s) with knowledge of the determined (or predicted) language can provide feedback on the determined (or predicted) language using language detected feedback box 695. In some embodiments, language detected feedback box 695 can include options to confirm that the determined (or predicted) language is correctly determined or is not correctly determined. In some embodiments, language detected feedback box 695 can include options to enter the correct language for the emergency communication if the feedback indicates that the determined (or predicted) language is not correctly determined. In some embodiments, the output of language detected feedback box 695 (along with the determined language and/or the received emergency communication) can be an input to machine learning model 519 to train and/or update machine learning model 519 for determining the language of the emergency communication.

Figure 7A:
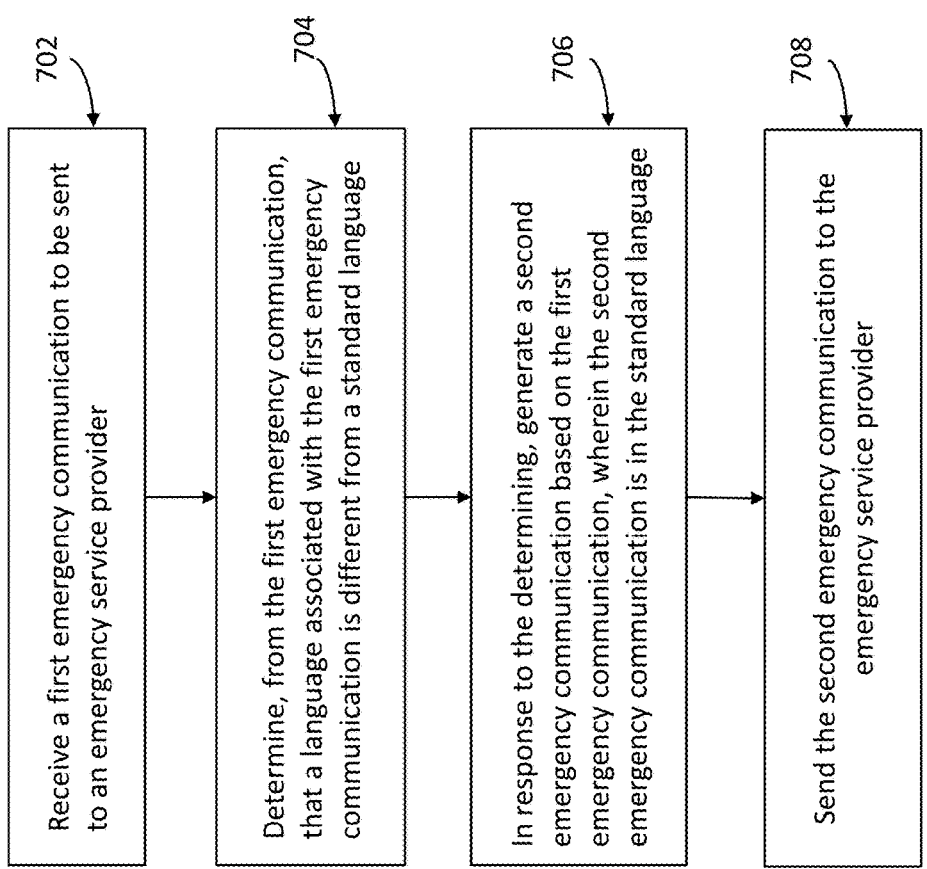
FIG. 7A illustrates an example method for a system providing translated emergency communication, according to some embodiments of this disclosure.

FIG. 7A illustrates an example method 700 for a system (e.g., ERDP 510) providing translated emergency communication, according to some embodiments of this disclosure. Method 700 may be described with regard to elements of FIGS. 1-6 and may be performed by ERDP 510 and/or computer system 900 of FIG. 9. But method 700 is not limited to the specific aspects depicted in those figures and other systems may be used to perform the method as will be understood by those skilled in the art. It is to be appreciated that not all operations may be needed, and the operations may not be performed in the same order as shown in FIG. 7A.

At 702, a first emergency communication is received. The first emergency communication is to be sent to an emergency provider. At 704, it is determined, from the first emergency communication, that a language associated with the first emergency communication is different from a standard language. In some embodiments, step 704 can further include generating a probability value indicating a confidence level indicating the accuracy of the determination that the language associated with the first emergency communication is different from the standard language.

In response to the determining, and at 706, a second emergency communication is generated based on the first emergency communication, where the second emergency communication is in the standard language. In some embodiments, the second emergency communication can include a summary of the first emergency communication. The summary of the first emergency communication can include one or more emergency keywords in the standard language. Additionally, or alternatively, the summary of the first emergency communication can include one or more codes. In some embodiments, step 708 can further include generating a probability value indicating a confidence level that the second emergency communication is an accurate translation of the first emergency communication. At 708, the second emergency communication is sent to the emergency service provider.

Figure 7B:
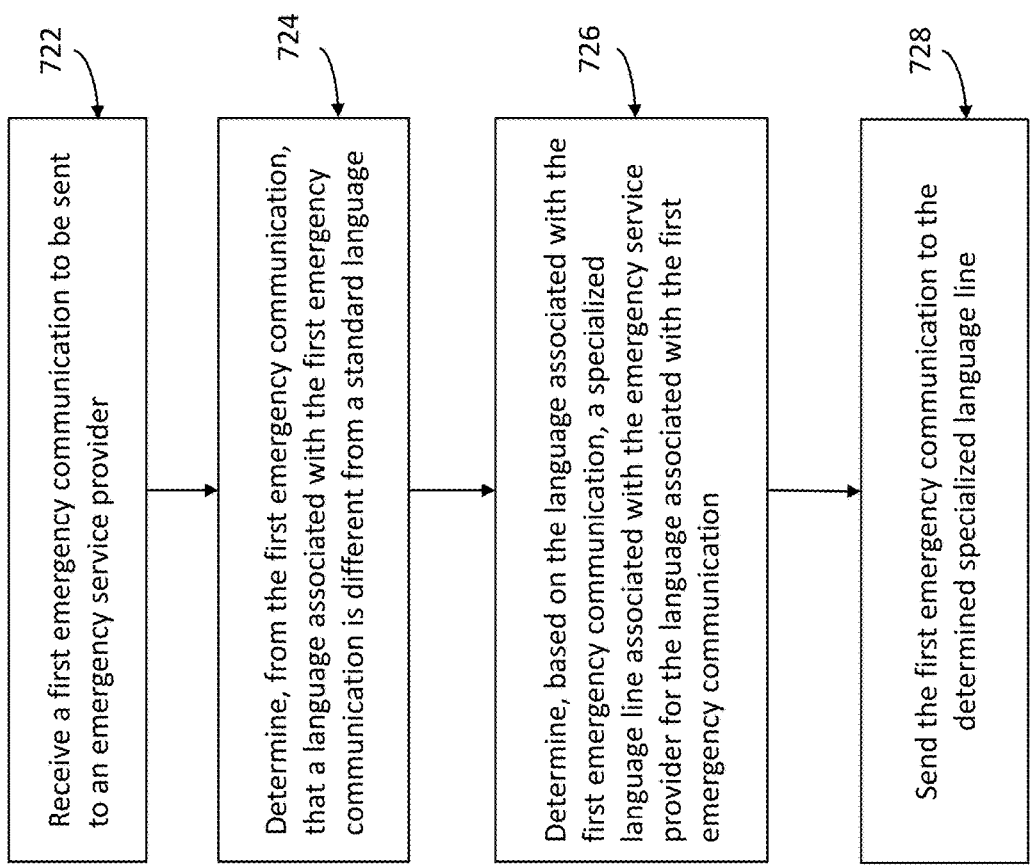
FIG. 7B illustrates an example method for a system communicating an emergency communication to a determined specialized language line, according to some embodiments of this disclosure.

FIG. 7B illustrates an example method 720 for a system (e.g., ERDP 510) communicating an emergency communication to a determined specialized language line, according to some embodiments of this disclosure. Method 720 may be described with regard to elements of FIGS. 1-6 and may be performed by ERDP 510 and/or computer system 900 of FIG. 9. But method 720 is not limited to the specific aspects depicted in those figures and other systems may be used to perform the method as will be understood by those skilled in the art. It is to be appreciated that not all operations may be needed, and the operations may not be performed in the same order as shown in FIG. 7B.

At 722, a first emergency communication is received. The first emergency communication is to be sent to an emergency provider. At 724, it is determined, from the first emergency communication, that a language associated with the first emergency communication is different from a standard language. In some embodiments, step 724 can further include generating a probability value indicating a confidence level indicating the accuracy of the determination that the language associated with the first emergency communication is different from the standard language.

At 726, based on the language associated with the first emergency communication, a specialized language line associated with the emergency service provider is determined for the language associated with the first emergency communication. At 728, the first emergency communication is send to the determined specialized language line.

Figure 7C:
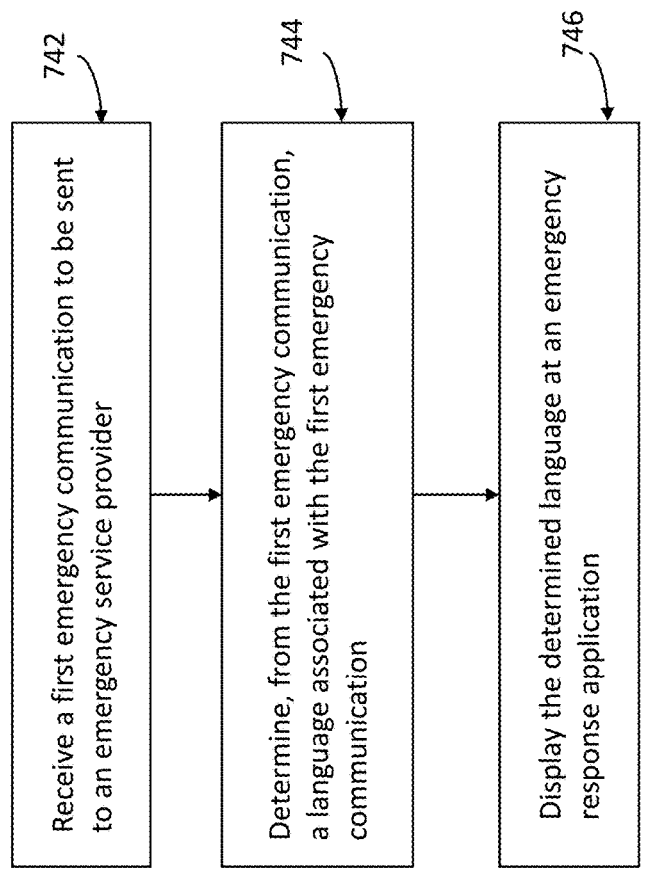
FIG. 7C illustrates an example method for a system communicating a determined language of an emergency communication, according to some embodiments of this disclosure.

FIG. 7C illustrates an example method 740 for a system (e.g., ERDP 510) communicating a determined language of an emergency communication, according to some embodiments of this disclosure. Method 740 may be described with regard to elements of FIGS. 1-6 and may be performed by ERDP 510 and/or computer system 900 of FIG. 9. But method 740 is not limited to the specific aspects depicted in those figures and other systems may be used to perform the method as will be understood by those skilled in the art. It is to be appreciated that not all operations may be needed, and the operations may not be performed in the same order as shown in FIG. 7C.

At 742, a first emergency communication is received. The first emergency communication is to be sent to an emergency provider.

At 744, a language associated with the first emergency communication is determined (or predicted) from the first emergency communication. In some embodiments, step 744 can further include generating a probability value indicating a confidence level that the determined (or predicted) language is an accurate language associated with the first emergency communication.

At 746, determined (or predicted language) is sent to an emergency response application. Additionally, or alternatively, the determined language is displayed at the emergency response application. In some embodiments, step 746 can further include sending and/or displaying the probability value determine at 744.

Figure 8A:
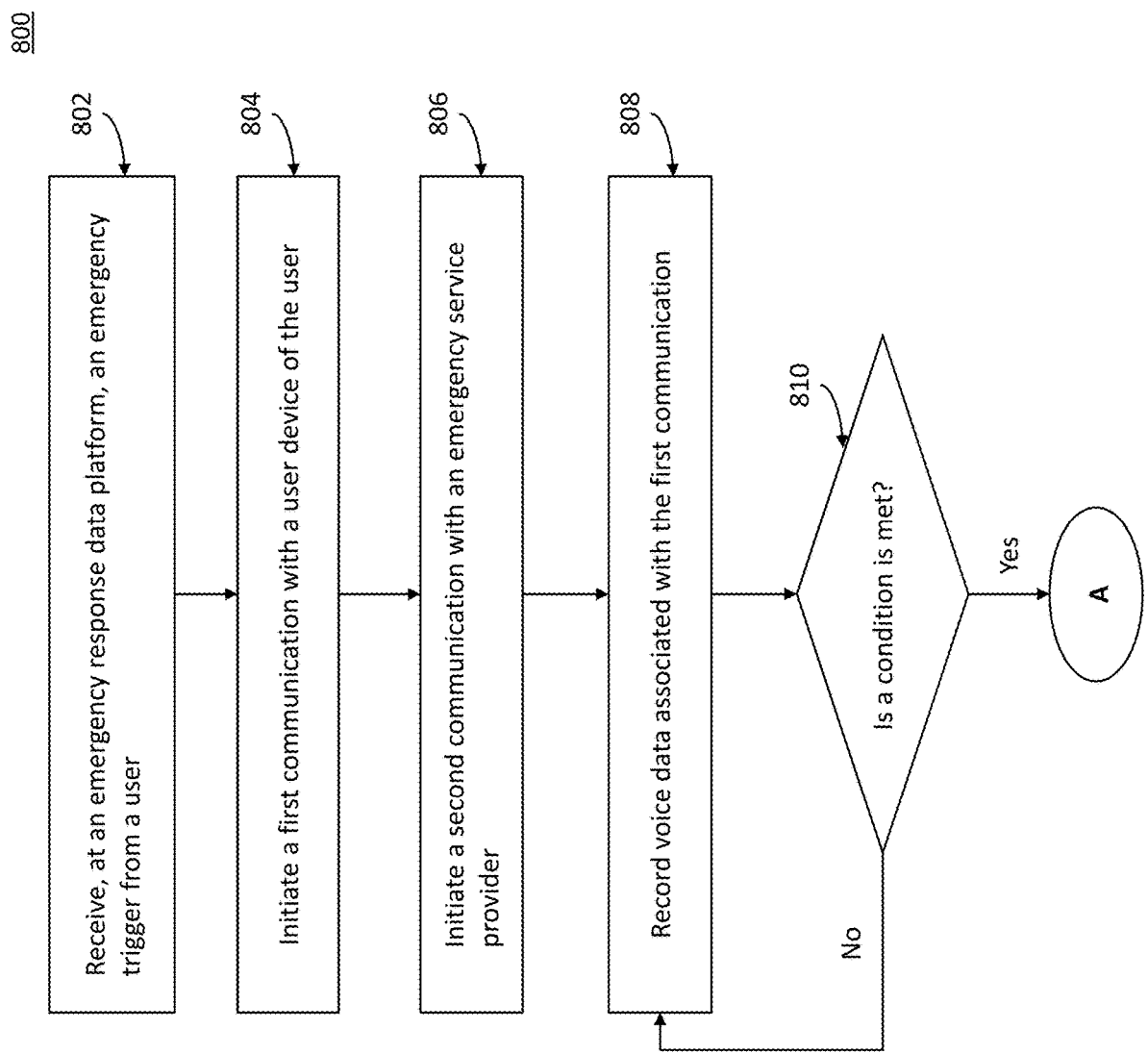
FIGS. 8A and 8B illustrate another example method for a system (e.g., ERDP 510) providing translated emergency communication, according to some embodiments of this disclosure.
Figure 8B:
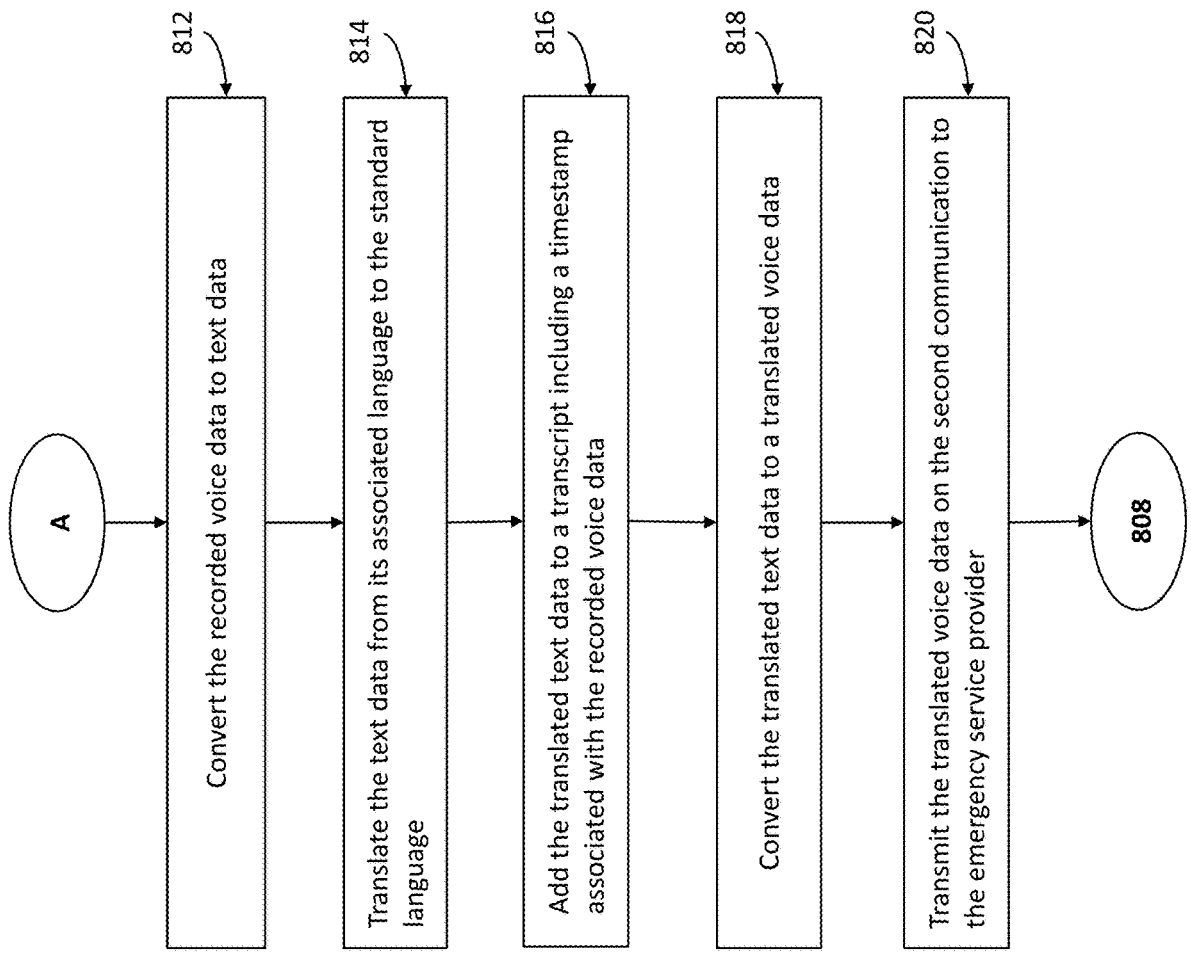

FIGS. 8A and 8B illustrate another example method 800 for a system (e.g., ERDP 510) providing translated emergency communication, according to some embodiments of this disclosure. Method 800 may be described with regard to elements of FIGS. 1-7 and may be performed by ERDP 510 and/or computer system 900 of FIG. 9. But method 800 is not limited to the specific aspects depicted in those figures and other systems may be used to perform the method as will be understood by those skilled in the art. It is to be appreciated that not all operations may be needed, and the operations may not be performed in the same order as shown in FIGS. 8A and 8B.

At 802, at an emergency response data platform, an emergency trigger is received from a user. At 804, a first communication is initiated with a user device of the user. For example, the emergency response data platform (e.g., ERDP 510) initiates a voice call with the user device. At 806, a second communication is initiated with an emergency service provider. For example, the emergency response data platform initiates a voice call with an emergency service provider (e.g., ESP 530). At 808, voice data associated with the first communication is recorded. At 810, it is checked whether a condition is met. For example, the emergency response data platform (e.g., ERDP 510) can check whether a gap in the recorded voice data is detected. If the condition is not met, method 800 moves back to operation 808. If the condition is met, method 800 moves to operation 812.

At 812, recorded voice data can be converted to text data and at 814, the text data is translated from its associated language to the standard language (e.g., the English language). At 816, the translated text data is added to a transcript including a timestamp associated with the recorded voice data. At 818, the translated text data is converted to a translated voice data. At 820, the translated voice data is transmitted on the second communication to the emergency service provider.

Figure 9:
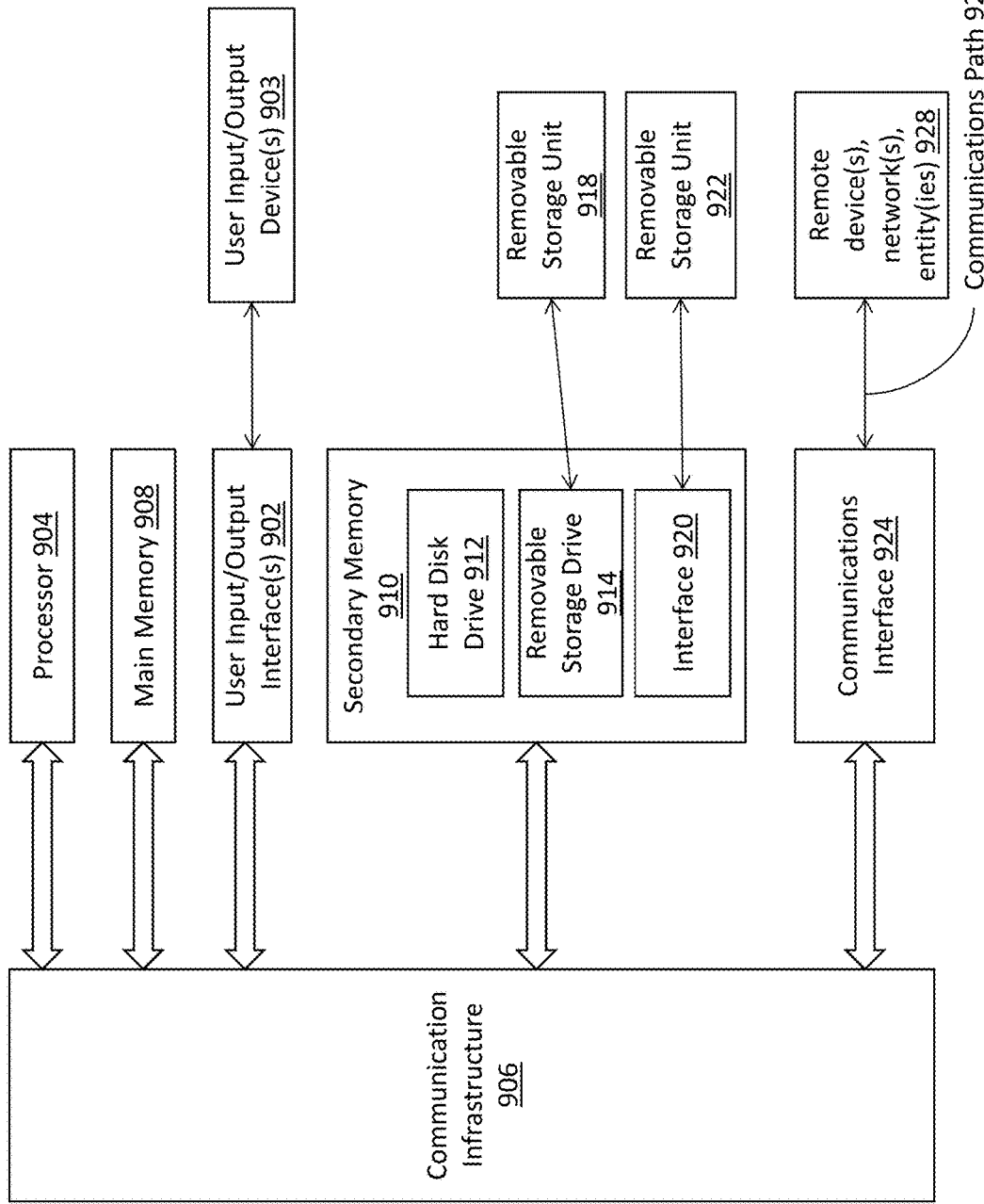
FIG. 9 is an example computer system useful for implementing various embodiments.

Various embodiments can be implemented, for example, using one or more computer systems, such as computer system 900 shown in FIG. 9. Computer system 900 can be used, for example, to implement method 700 of FIG. 7A, method 720 of FIG. 7B, and/or method 800 of FIGS. 8A and 8B. Computer system 900 can be any computer capable of performing the functions described herein.

Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In an embodiment, a tangible apparatus or article of manufacture comprising a tangible computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A computer implemented method for emergency communication translation, comprising:
    receiving a first emergency communication to be sent to an emergency service provider;
    determining, from the first emergency communication, that a language associated with the first emergency communication is different from a standard language;
    in response to the determining, generating a second emergency communication based on the first emergency communication, wherein the second emergency communication is in the standard language; and
    sending the second emergency communication to the emergency service provider,
    wherein the generating the second emergency communication further comprises:
        sampling a first portion of the first emergency communication; and
        translating the sampled first portion of the first emergency communication from the language associated with the first emergency communication to the standard language.

2. The computer implemented method of claim 1, wherein the first emergency communication comprises at least one of a short message service (SMS) message, internet-based message, portions of an emergency call, a recorded audio/video feed, and a live audio/video feed.

3. The computer implemented method of claim 1, wherein the generating the second emergency communication further comprises:
    translating, in real-time or in near real-time, the first emergency communication from the language of the first emergency communication to the standard language.

4. The computer implemented method of claim 1,
    wherein the determining that the language associated with the first emergency communication is different from the standard language further comprises:
    storing a second portion of the first emergency communication;
    converting the second portion of the first emergency communication to text data; and determining, based on the text data, that the language associated with the first emergency communication is different from the standard language.

5. The computer implemented method of claim 1, wherein the generating the second emergency communication further comprises:
storing a second portion of the first emergency communication;
converting the second portion of the first emergency communication to first text data; and
generating second text data by translating the first text data from the language associated with the first emergency communication to the standard language.

6. The computer implemented method of claim 1, wherein the first portion of the first emergency communication is a predetermined portion of the first emergency communication.

7. The computer implemented method of claim 1, further comprising:
receiving data associated with a user device; and
determining, based on the data associated with the user device, that the first emergency communication is in the language different from the standard language,
wherein the data associated with the user device comprises at least one of location data associated with the user device, language preference data set in the user device, a language setting pre-installed on the user device, preference data associated with a keyboard of the user device, predicted language based on previous emergency communications, or demographics associated with a user of the user device.

8. The computer implemented method of claim 1, further comprising:
receiving data associated with a user device; and
predicting, based on the data associated with the user device, that the first emergency communication is in the language different from the standard language,
wherein the data associated with the user device comprises at least one of location data associated with the user device, language preference data set in the user device, a language setting pre-installed on the user device, preference data associated with a keyboard of the user device, predicted language based on previous emergency communications, or demographics associated with a user of the user device.

9. The computer implemented method of claim 1, wherein the second emergency communication comprises a summary of the first emergency communication, and wherein the summary of the first emergency communication comprises one or more emergency keywords in the standard language or one or more codes associated with the first emergency communication.

10. The computer implemented method of claim 1, further comprising:
displaying a probability value indicating a confidence level that the second emergency communication is an accurate translation of the first emergency communication.

11. The computer implemented method of claim 1, further comprising:
storing at least a second portion of the first emergency communication and a third portion of the second emergency communication; and
using the second portion of the first emergency communication and the third portion of the second emergency communication to update an algorithm used for the determining and the generating for subsequent emergency communications.

12. A system for emergency communication translation, comprising:
a memory; and
at least one processor coupled to the memory and configured to:
receive a first emergency communication to be sent to an emergency service provider;
determine, from the first emergency communication, that a language associated with the first emergency communication is different from a standard language;
in response to the determining, generate a second emergency communication based on the first emergency communication, wherein the second emergency communication is in the standard language;
send the second emergency communication to the emergency service provider; and
display a confidence level that the second emergency communication is an accurate translation of the first emergency communication.

13. The system of claim 12, wherein to generate the second emergency communication, the at least one processor is further configured to:
translate, in real-time or in near real-time, the first emergency communication from the language of the first emergency communication to the standard language.

14. The system of claim 12, wherein to determine that the language associated with the first emergency communication is different from the standard language, the at least one processor is further configured to:
store a portion of the first emergency communication;
convert the portion of the first emergency communication to text data; and
determine, based on the text data, that the language associated with the first emergency communication is different from the standard language.

15. The system of claim 12, wherein to generate the second emergency communication, the at least one processor is further configured to:
store a portion of the first emergency communication;
convert the portion of the first emergency communication to first text data; and
generate second text data by translating the first text data from the language associated with the first emergency communication to the standard language.

16. The system of claim 12, wherein the at least one processor is further configured to:
receive data associated with a user device; and
determine, based on the data associated with the user device, that the first emergency communication is in the language different from the standard language, wherein the data associated with the user device comprises at least one of location data associated with the user device, language preference data set in the user device, a language setting pre-installed on the user device, preference data associated with a keyboard of the user device, predicted language based on previous emergency communications, or demographics associated with a user of the user device.

17. The system of claim 12, wherein the second emergency communication comprises a summary of the first emergency communication, and wherein the summary of the first emergency communication comprises one or more emergency keywords in the standard language or one or more codes associated with the first emergency communication.

18. The system of claim 12, wherein, to display the confidence level, the at least one processor is configured to:
   display a probability value indicating the confidence level.

19. The system of claim 12, wherein the at least one processor is further configured to:
   store at least a first portion of the first emergency communication and a second portion of the second emergency communication; and
   use the first portion of the first emergency communication and the second portion of the second emergency communication to update an algorithm used for the determining and the generating for subsequent emergency communications.

20. A non-transitory computer-readable medium having instructions stored thereon that, when executed by at least one computing device, cause the at least one computing device to perform operations comprising:
   receiving a first emergency communication to be sent to an emergency service provider;
   determining, from the first emergency communication, that a language associated with the first emergency communication is different from a standard language;
   in response to the determining, generating a second emergency communication based on the first emergency communication, wherein the second emergency communication is in the standard language; and
   sending the second emergency communication to the emergency service provider,
   wherein the second emergency communication comprises a summary of the first emergency communication, and wherein the summary of the first emergency communication comprises one or more emergency keywords in the standard language or one or more codes associated with the first emergency communication.

* * * * *

UNITED STATES PATENT AND TRADEMARK OFFICE
CERTIFICATE OF CORRECTION

PATENT NO. : 12,363,520 B2
APPLICATION NO. : 17/738779
DATED : July 15, 2025
INVENTOR(S) : Ferentz et al.

Page 1 of 1

It is certified that error appears in the above-identified patent and that said Letters Patent is hereby corrected as shown below:

On the Title Page

Column 2, Item (74), in "Attorney, Agent, or Firm", Line 2, delete "Fox." and insert -- Fox --, therefor.

In the Claims

In Column 36, Claim 4, Lines 61-63, delete "wherein the determining that the language associated with the first emergency communication is different from the standard language further comprises:" and insert the same at Line 60, after "claim 1,", as a continuation paragraph.

In Column 38, Claim 16, Lines 55-63, delete "wherein the data associated ........... the user device." and insert the same at Line 56, as a new sub-point.

Signed and Sealed this
Twenty-sixth Day of August, 2025

Coke Morgan Stewart
*Acting Director of the United States Patent and Trademark Office*